US012699935B1

(12) United States Patent
Matthews et al.

(10) Patent No.: US 12,699,935 B1
(45) Date of Patent: Aug. 4, 2026

(54) REAL-TIME COLLECTION AND DISPLAY OF MANAGEMENT INFORMATION

(71) Applicant: SUMMIT WASH HOLDINGS, L.L.C., Norwalk, CT (US)

(72) Inventors: Kevin D. Matthews, Omaha, NE (US); Stephen M. Hudson, Jr., Omaha, NE (US)

(73) Assignee: SUMMIT WASH HOLDINGS, L.L.C., Norwalk, CT (US)

( * ) Notice: Subject to any disclaimer, the term of this patent is extended or adjusted under 35 U.S.C. 154(b) by 161 days.

(21) Appl. No.: 18/314,580

(22) Filed: May 9, 2023

Related U.S. Application Data

(60) Provisional application No. 63/339,749, filed on May 9, 2022.

(51) Int. Cl.
*G06Q 10/0631* (2023.01)
(52) U.S. Cl.
CPC ............................ *G06Q 10/063114* (2013.01)
(58) Field of Classification Search
None
See application file for complete search history.

(56) References Cited

U.S. PATENT DOCUMENTS

| | | | | |
|---|---|---|---|---|
| 6,678,698 | B2 * | 1/2004 | Fredell | G06Q 10/06 707/999.01 |
| 9,424,545 | B1 * | 8/2016 | Lee | G06Q 10/063114 |
| 2007/0027732 | A1 * | 2/2007 | Hudgens | G06Q 10/0631 705/7.17 |
| 2011/0015963 | A1 * | 1/2011 | Chafle | G06Q 10/063116 455/466 |
| 2012/0197677 | A1 * | 8/2012 | Bhamidipaty | G06Q 10/06311 705/7.13 |
| 2013/0059598 | A1 * | 3/2013 | Miyagi | H04W 4/023 455/456.1 |

(Continued)

OTHER PUBLICATIONS

Zhao, Wei, Krithi Ramamritham, and John A. Stankovic. "Scheduling tasks with resource requirements in hard real-time systems." IEEE transactions on software engineering 5 (1987): 564-577 (Year: 1987).*

(Continued)

*Primary Examiner* — Darlene Garcia-Guerra
(74) *Attorney, Agent, or Firm* — Erik M. Antonson; Advent, LLP

(57) ABSTRACT
A real-time management system includes a processor to receive a schedule with tasks to be completed by a first associate at time intervals, a database with contact information for a device of the first associate and another device of a second associate having a managerial role with respect to the first associate, and a communications interface to initiate communications with the first device and the second device. The system initiates a first alert to the device of the first associate to notify the first associate of a task prior to an expiration of a time interval, determine completion/non-completion of the task, and based upon the completion/non-completion of the task by the first associate, initiate a second alert to the device of the second associate to inform the second associate of a status of the task. The real-time management system also includes a physical indicator of at least one task.

20 Claims, 23 Drawing Sheets

(56) References Cited

U.S. PATENT DOCUMENTS

| | | | | | |
|---|---|---|---|---|---|
| 2014/0020051 | A1* | 1/2014 | Lu | .................. | G06F 21/6218 |
| | | | | | 726/4 |
| 2014/0057232 | A1* | 2/2014 | Wetmore | ............. | G09B 19/00 |
| | | | | | 600/28 |
| 2014/0327540 | A1* | 11/2014 | Shin | .................. | G08B 21/0446 |
| | | | | | 340/539.11 |
| 2018/0247276 | A1* | 8/2018 | Tamma | ............. | G06Q 10/1097 |
| 2019/0343429 | A1* | 11/2019 | Elhawary | ............. | A61B 5/6823 |
| 2019/0354753 | A1* | 11/2019 | Worrall | .................. | G06V 40/20 |
| 2020/0042912 | A1* | 2/2020 | Hamilton | ....... | G06Q 10/063114 |
| 2020/0042950 | A1* | 2/2020 | Gulden | ................ | H04W 4/029 |
| 2020/0401970 | A1* | 12/2020 | Xu | .................. | G06Q 10/06316 |
| 2021/0027485 | A1* | 1/2021 | Zhang | .................. | G06T 7/11 |
| 2022/0092521 | A1* | 3/2022 | Hunter | ................ | G06F 40/205 |

OTHER PUBLICATIONS

Michelson, K. A., et al. "A mobile, collaborative, real time task list for inpatient environments." Applied Clinical Informatics 6.04 (2015): 677-683 (Year: 2015).*

Kimani, Mervyne. "A web-based employee time tracking system: enhancing operational efficiency in the workplace." (2020) (Year: 2020).*

\* cited by examiner

Figure 3:
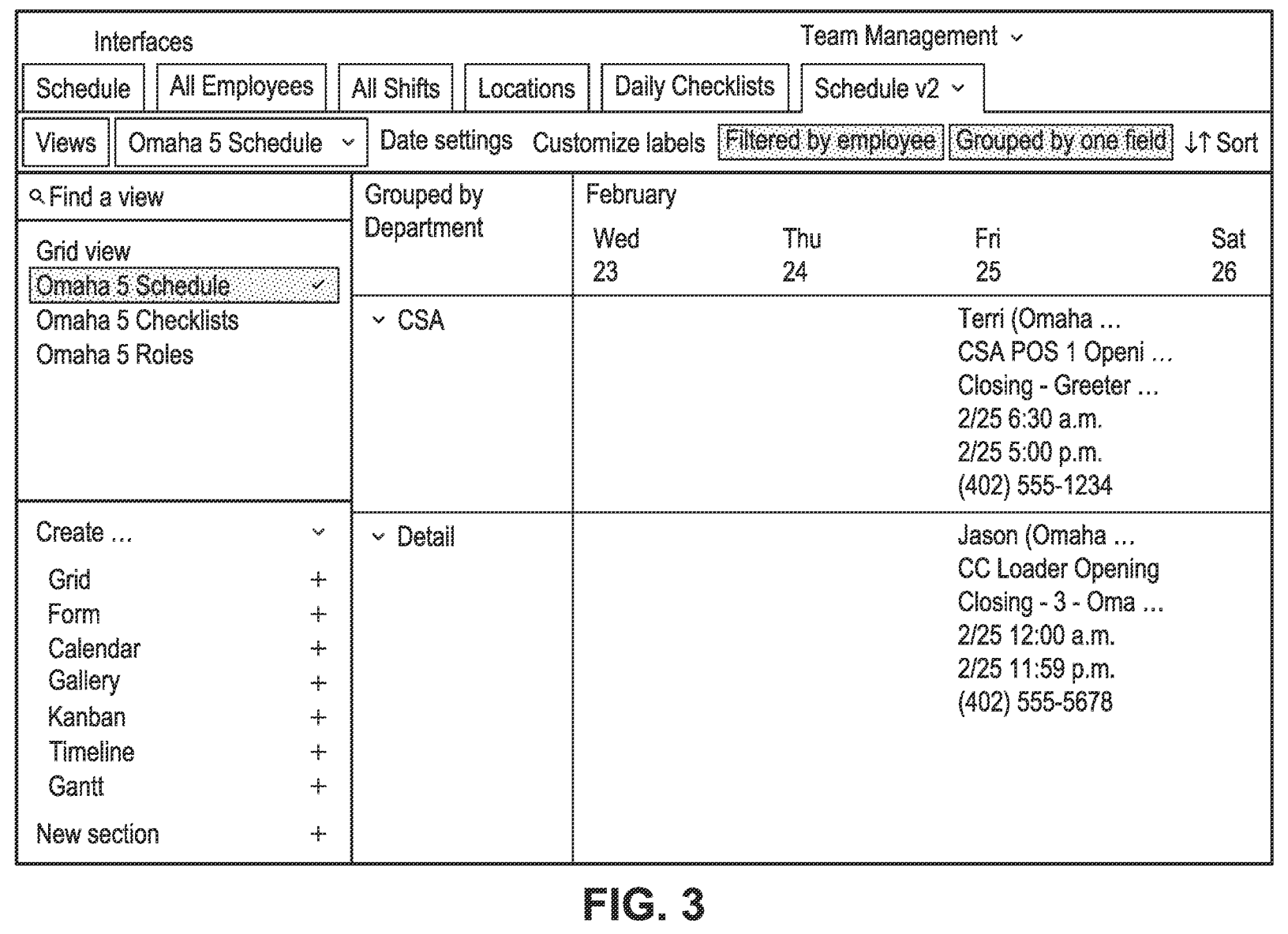

Team Management ⌄

| Schedule | All Shifts | Locations | Daily Checklists | Schedule v2 ⌄ |
| Interfaces | All Employees | | | |

Views | Omaha 5 Schedule ⌄ | Date settings  Customize labels  Filtered by employee  Grouped by one field  ⇅ Sort ⌕ Find a view Grid view Omaha 5 Schedule ✓
Omaha 5 Checklists
Omaha 5 Roles Grouped by
Department February

| | Wed 23 | Thu 24 | Fri 25 | Sat 26 |

⌄ CSA

Terri (Omaha ...
CSA POS 1 Openi ...
Closing - Greeter ...
2/25 6:30 a.m.
2/25 5:00 p.m.
(402) 555-1234

Jason (Omaha ...
CC Loader Opening
Closing – 3 - Oma ...
2/25 12:00 a.m.
2/25 11:59 p.m.
(402) 555-5678

⌄ Detail

Create ...    ⌄

Grid          +
Form          +
Calendar      +
Gallery       +
Kanban        +
Timeline      +
Gantt         +

New section   +

Results

Car Wash

Location Leaderboard by Site
Feb 2, 8:16:52 a.m.

Location

158

| | Location | Paid Cars | UL Sign Ups | Penetration | Net Growth |
|---|---|---|---|---|---|
| 1. | Kansas City | 2 | 2 | 100% | -16 |
| 2. | Fort Crook | 1 | 1 | 100% | -10 |
| 3. | Fairfield | 48 | 37 | 77.08% | 25 |
| 4. | Shelton | 4 | 2 | 50% | -10 |
| 5. | Milford | 13 | 6 | 46.15% | -12 |
| 6. | Manchester | 16 | 7 | 43.75% | -21 |
| 7. | Norwalk | 37 | 15 | 40.54% | -15 |
| 8. | Lincoln | 0 | 0 | 0% | -11 |
| 9. | State Street | 8 | 0 | 0% | -20 |
| 10. | Omaha 3 | 1 | 0 | 0% | -26 |
| 11. | Avon | 12 | 0 | 0% | -8 |
| 12. | Omaha 5 | 0 | 0 | 0% | -25 |
| 13. | Omaha 2 | 2 | 0 | 0% | -16 |
| 14. | Omaha 1 | 0 | 0 | 0% | -29 |

See Data by CSA

Lot Check/Game Plans

| | ↕ Sort ⋯ | | | | Q |
|---|---|---|---|---|---|
| 1 Hidden Field | ⩵ Filter | Grouped by 1 Field | | | |

Floater - [2] Detail Boards, Vacuum    Count 61

| | | | | | |
|---|---|---|---|---|---|
| 1 | 5195699833525185107 | 2/1 | 6:13 pm | Tyler | Floater - [2] Details Boards, Vacuum |
| 2 | 5195699513522557544 | 2/1 | 6:12 pm | Tyler | Floater - [2] Details Boards, Vacuum |
| 3 | 5195636323531833513 | 2/1 | 4:27 pm | Eddy | Floater - [2] Details Boards, Vacuum |
| 4 | 5195600590523235257 | 2/1 | 3:27 pm | Raven | Floater - [2] Details Boards, Vacuum |
| 5 | 5195448106126045955 | 2/1 | 11:13 am | Raven | Floater - [2] Details Boards, Vacuum |
| 6 | 5195372244115921604 | 2/1 | 9:07 am | Jocelyn | Floater - [2] Details Boards, Vacuum |
| 7 | 5195362714119852709 | 2/1 | 8:51 am | Dionna | Floater - [2] Details Boards, Vacuum |
| 8 | 5195320154119071127 | 2/1 | 7:40 am | Dionna | Floater - [2] Details Boards, Vacuum |
| 9 | 5194814573228597288 | 1/31 | 5:37 pm | D | Floater - [2] Details Boards, Vacuum |
| 10 | 5194758700235364757 | 1/31 | 4:04 pm | Kelechi | Floater - [2] Details Boards, Vacuum |
| 11 | 5194734545115809067 | 1/31 | 3:24 pm | T | Floater - [2] Details Boards, Vacuum |
| 12 | 5194694741616857433 | 1/31 | 2:17 pm | Raven | Floater - [2] Details Boards, Vacuum |
| 13 | 5194638009311351295 | 1/31 | 12:43 pm | Raven | Floater - [2] Details Boards, Vacuum |
| 14 | 5194567282511891277 | 1/31 | 10:45 am | T | Floater - [2] Details Boards, Vacuum |
| 15 | 5194566699631956878 | 1/31 | 10:44 am | T | Floater - [2] Details Boards, Vacuum |
| 16 | 5194527708953223334 | 1/31 | 9:39 am | Brandon | Floater - [2] Details Boards, Vacuum |
| 17 | 5194511724118010351 | 1/31 | 9:12 am | Dionna | Floater - [2] Details Boards, Vacuum |
| 18 | 5194474494114061390 | 1/31 | 8:10 am | Dionna | Floater - [2] Details Boards, Vacuum |
| 19 | 5194459503238843128 | 1/31 | 7:45 am | Eddy | Floater - [2] Details Boards, Vacuum |
| 20 | 5194430534114142594 | 1/31 | 6:57 am | Dionna | Floater - [2] Details Boards, Vacuum |
| 21 | 5193866242591991493 | 1/30 | 3:17 pm | T | Floater - [2] Details Boards, Vacuum |

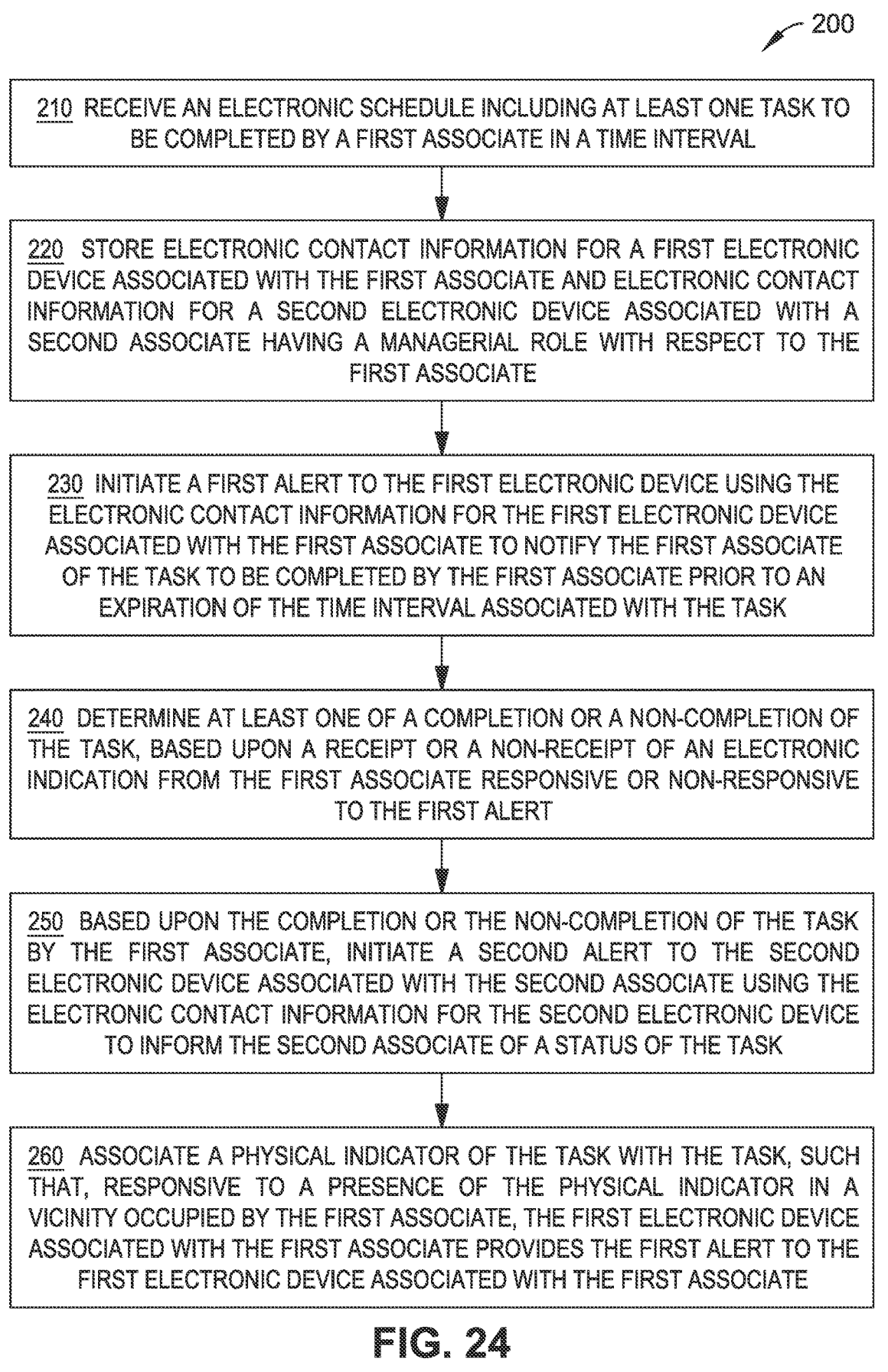

210 RECEIVE AN ELECTRONIC SCHEDULE INCLUDING AT LEAST ONE TASK TO BE COMPLETED BY A FIRST ASSOCIATE IN A TIME INTERVAL

220 STORE ELECTRONIC CONTACT INFORMATION FOR A FIRST ELECTRONIC DEVICE ASSOCIATED WITH THE FIRST ASSOCIATE AND ELECTRONIC CONTACT INFORMATION FOR A SECOND ELECTRONIC DEVICE ASSOCIATED WITH A SECOND ASSOCIATE HAVING A MANAGERIAL ROLE WITH RESPECT TO THE FIRST ASSOCIATE

230 INITIATE A FIRST ALERT TO THE FIRST ELECTRONIC DEVICE USING THE ELECTRONIC CONTACT INFORMATION FOR THE FIRST ELECTRONIC DEVICE ASSOCIATED WITH THE FIRST ASSOCIATE TO NOTIFY THE FIRST ASSOCIATE OF THE TASK TO BE COMPLETED BY THE FIRST ASSOCIATE PRIOR TO AN EXPIRATION OF THE TIME INTERVAL ASSOCIATED WITH THE TASK

240 DETERMINE AT LEAST ONE OF A COMPLETION OR A NON-COMPLETION OF THE TASK, BASED UPON A RECEIPT OR A NON-RECEIPT OF AN ELECTRONIC INDICATION FROM THE FIRST ASSOCIATE RESPONSIVE OR NON-RESPONSIVE TO THE FIRST ALERT

250 BASED UPON THE COMPLETION OR THE NON-COMPLETION OF THE TASK BY THE FIRST ASSOCIATE, INITIATE A SECOND ALERT TO THE SECOND ELECTRONIC DEVICE ASSOCIATED WITH THE SECOND ASSOCIATE USING THE ELECTRONIC CONTACT INFORMATION FOR THE SECOND ELECTRONIC DEVICE TO INFORM THE SECOND ASSOCIATE OF A STATUS OF THE TASK

260 ASSOCIATE A PHYSICAL INDICATOR OF THE TASK WITH THE TASK, SUCH THAT, RESPONSIVE TO A PRESENCE OF THE PHYSICAL INDICATOR IN A VICINITY OCCUPIED BY THE FIRST ASSOCIATE, THE FIRST ELECTRONIC DEVICE ASSOCIATED WITH THE FIRST ASSOCIATE PROVIDES THE FIRST ALERT TO THE FIRST ELECTRONIC DEVICE ASSOCIATED WITH THE FIRST ASSOCIATE

FIG. 24

REAL-TIME COLLECTION AND DISPLAY OF MANAGEMENT INFORMATION

CROSS-REFERENCE TO RELATED APPLICATIONS

The present application claims the benefit under 35 U.S.C. § 119 (e) of U.S. Provisional Application Ser. No. 63/339,749, filed May 9, 2022, and titled "REAL-TIME COLLECTION AND DISPLAY OF MANAGEMENT INFORMATION," which is herein incorporated by reference in its entirety.

BACKGROUND

The terms "management" and "managing" generally refer to the administration of organizations, such as business organizations. Management activities typically include managing the resources of a business, such as physical resources (e.g., materials, equipment), human resources (e.g., labor force, knowledge base), and other resources that can be used to produce value.

DRAWINGS

The Detailed Description is described with reference to the accompanying figures. The use of the same reference numbers in different instances in the description and the figures may indicate similar or identical items.

FIG. 3 is a diagrammatic illustration of a user interface for scheduling and assigning tasks to one or more associates in accordance with example embodiments of the present disclosure.

FIG. 22 is a diagrammatic illustration of a user interface with details of an automated site score, such as the automated site score illustrated in FIG. 21, in accordance with example embodiments of the present disclosure.

FIG. 24 is a block diagram illustrating a method for implementing real-time management for an organization, such as the real-time management systems illustrated in FIGS. 1 through 23, in accordance with example embodiments of the present disclosure.

DETAILED DESCRIPTION

Figure 1:
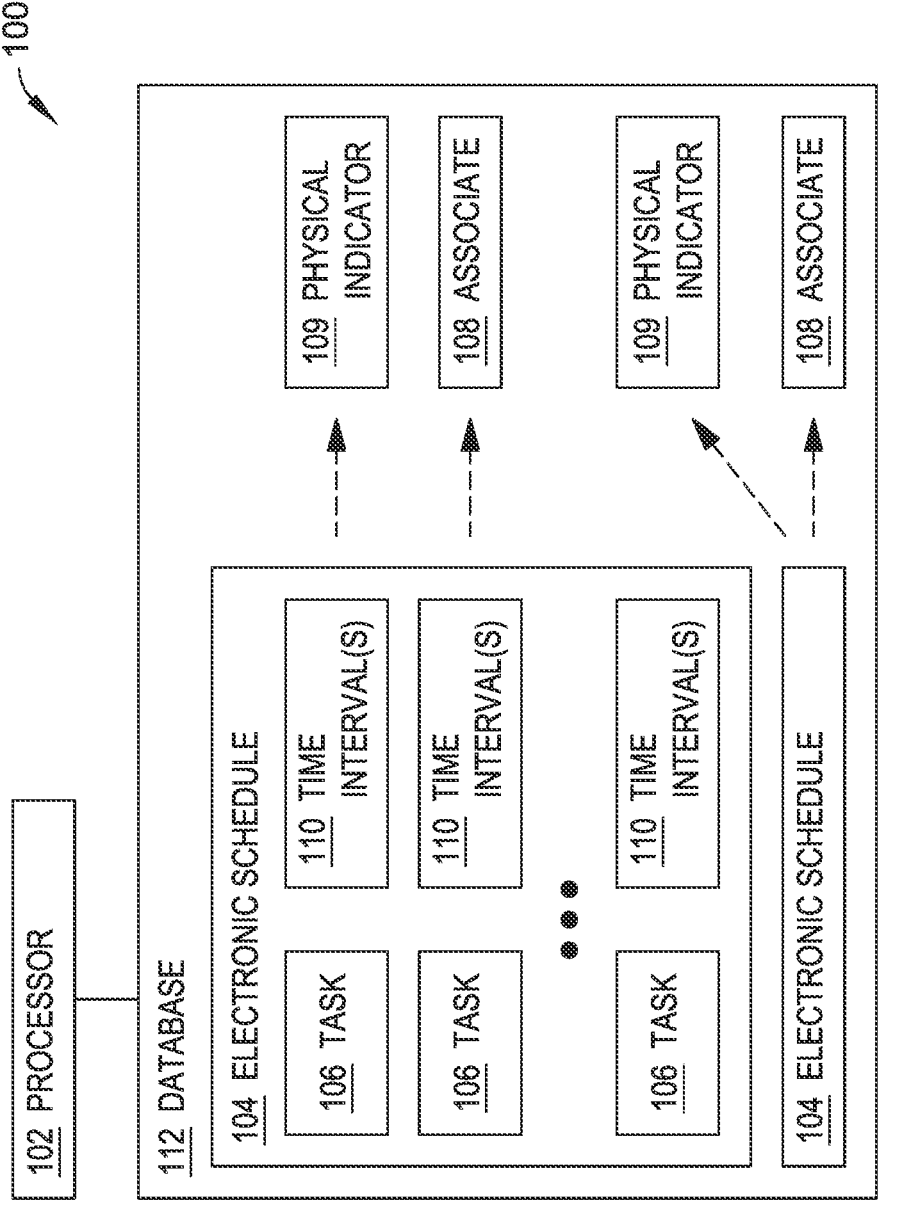
FIG. 1 is a block diagram illustrating a real-time management system providing a live operator interface for a hierarchical management organizational structure in accordance with example embodiments of the present disclosure.
Figure 2:
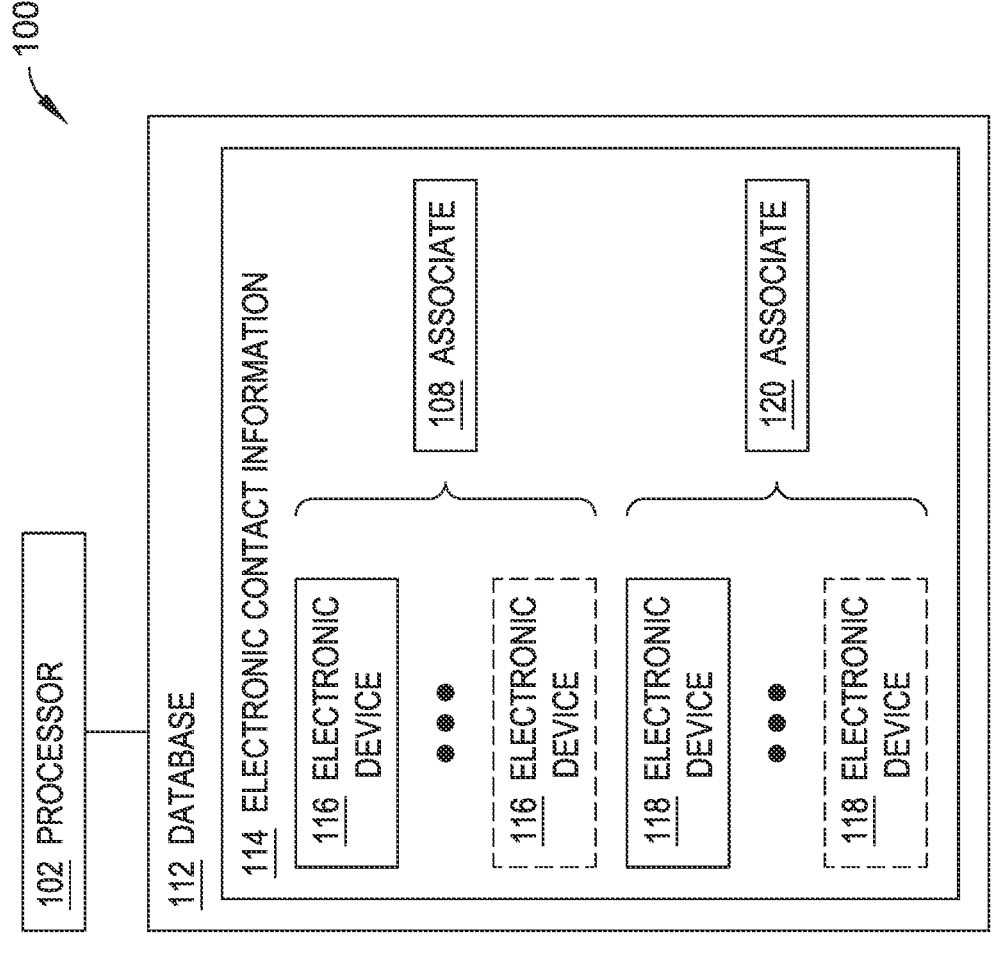
FIG. 2 is another block diagram of the real-time management system illustrated in FIG. 1.
Figures 4, 5:
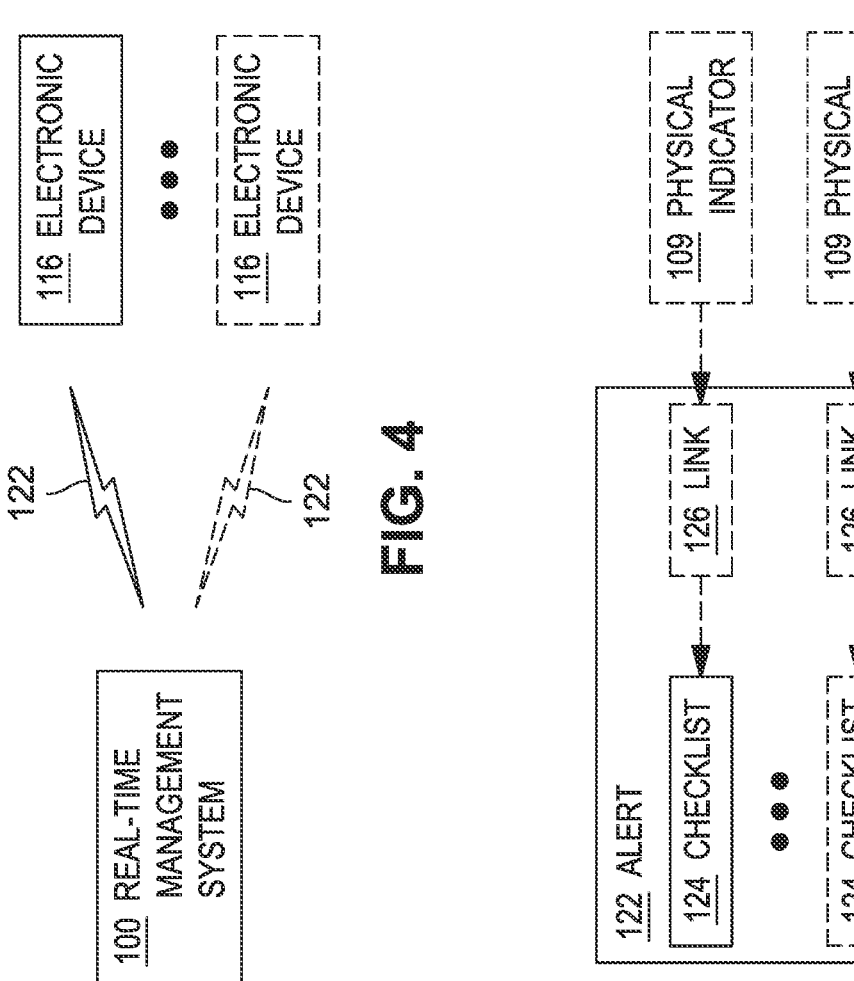
FIG. 4 is another block diagram of the real-time management system illustrated in FIG. 1.
FIG. 5 is a block diagram illustrating a first alert for a real-time management system, such as the real-time management system illustrated in FIG. 1, in accordance with example embodiments of the present disclosure.
Figure 6:
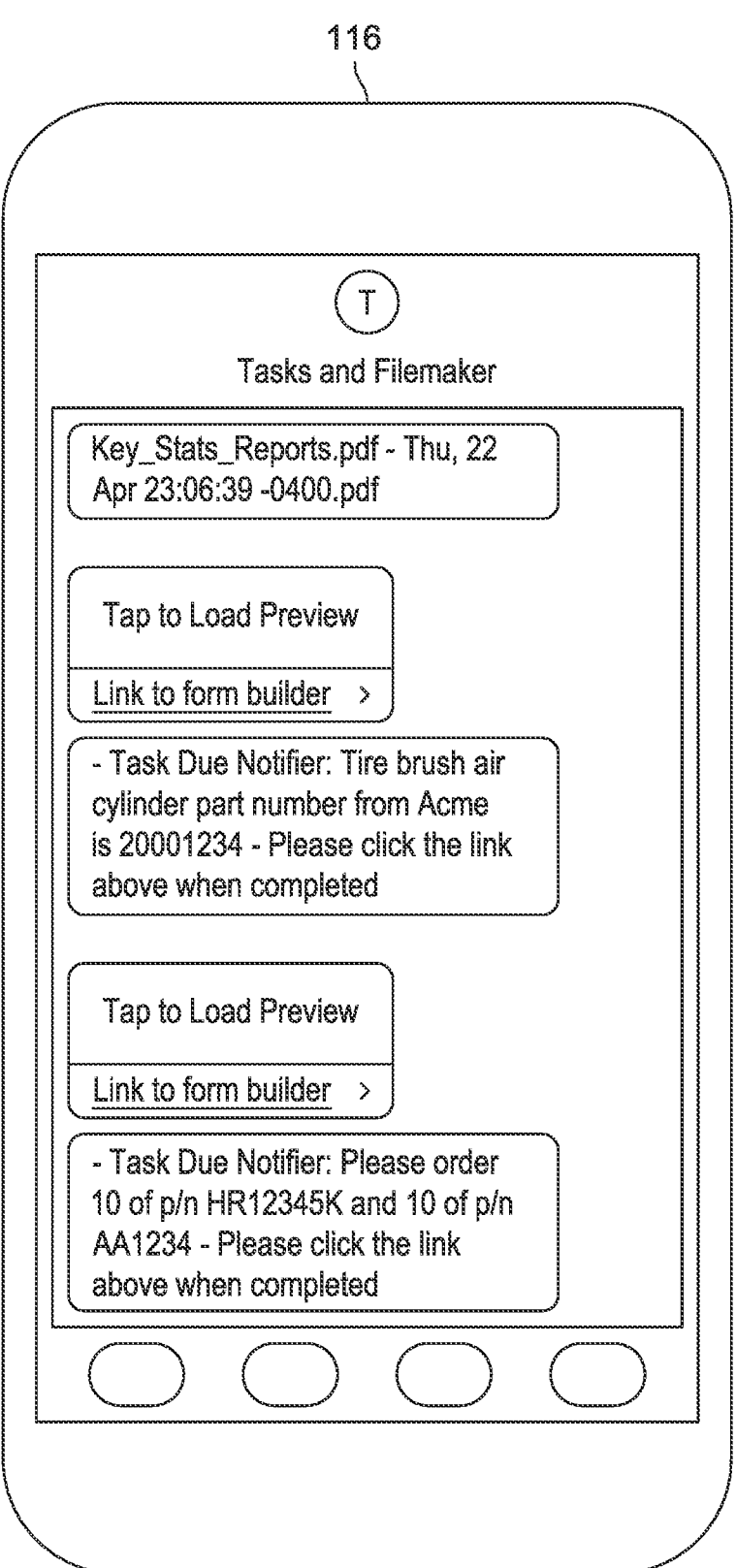
FIG. 6 is a diagrammatic illustration of a user interface with first alerts sent to an electronic device by a real-time management system, such as the real-time management system illustrated in FIG. 1, in accordance with example embodiments of the present disclosure.
Figure 7:
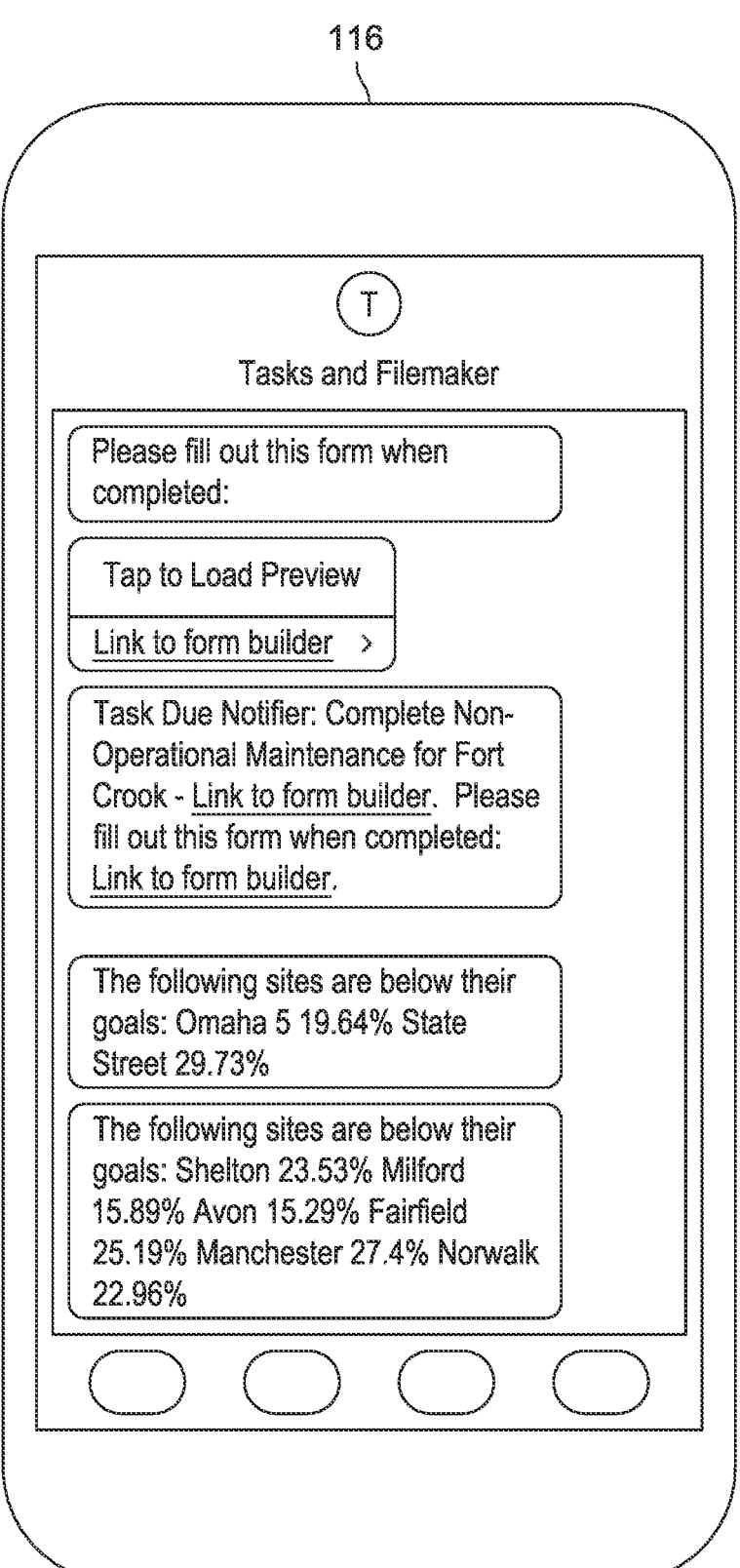
FIG. 7 is another diagrammatic illustration of a user interface with first alerts sent to an electronic device by a real-time management system, such as the real-time management system illustrated in FIG. 1, in accordance with example embodiments of the present disclosure.

Systems, techniques, and apparatus are described herein that provide for the management of business resources (materials, equipment, human resources) through the use of physical indicators, schedule management, task management, and/or the provision of key performance indicators. For example, physical indicators, such as QR codes, are used to manage staff and give personnel a way to interact with a real-time management system that does not necessarily require management of user access or system access by the real-time management system. Further, in addition to scheduling and task management, key performance indicators are provided by a real-time management system in real time. For example, real time sales data from point-of-sale providers is displayed along with task management data and audit data to give a true picture of site performance. Additionally, such data can be used by management to correlate high level results with compliance to expectations, which can be set within the real-time management system.

As described, real-time management systems can provide a "dashboard of dashboards," where key performance indicators can be collected from many separate and distinct sources, such as point of sale providers, mystery shoppers, audits, and so forth, and displayed alongside scheduling and task management performance statistics to give a full picture of how a business is operating. By providing continuous (or at least substantially continuous) feedback of results, operations may proceed smoothly within an organization, in some cases even in the absence of management personnel. Further, increases in sales and associate performance can be facilitated by the real-time management systems as described herein.

Referring generally to FIGS. 1 through 23, real-time management systems 100 are described. In embodiments, a real-time management system 100 includes one or more processors 102 configured to receive one or more electronic schedules 104 including multiple tasks 106 to be completed by one or more first associates 108 at multiple time intervals 110. In some embodiments, the real-time management system 100 can associate an electronic schedule 104 with a physical indicator 109 in a vicinity proximate to where one or more of the tasks 106 is to be completed (e.g., at one or more of the time intervals 110). As described, each one of the time intervals 110 is associated with a corresponding one of the tasks 106. The real-time management system 100 also includes one or more databases 112 including electronic contact information 114 for electronic devices 116 associated with the first associates 108 and electronic devices 118 associated with one or more second associates 120. As described herein, one or more of the second associates 120 has a managerial role with respect to one or more of the first associates 108.

The real-time management system 100 facilitates a live operator interface for a hierarchical management organizational structure, where tasks are automatically assigned to associates and reports are automatically generated for associates based upon their roles within an organizational hierarchy. In embodiments of the disclosure, the real-time management system 100 is configured to associate one or more roles with the first associates 108 and the second associates 120. For example, a first associate 108 can be a lower-level associate within a hierarchical organizational structure, such as a car wash attendant, a factory worker, a delivery person, and so forth. Continuing the present example, a second associate 120 has a managerial role with respect to one or more of the first associates 108. For instance, a second associate 120 can be a supervisor, an assistant manager, a site leader, a general manager, a district area manager, a partner, an owner, an operator, and so forth.

It should be noted that the roles of first and second associates 108 and 120 can be dynamically assigned and reassigned to the first and second associates 108 and 120. The first and second associates 108 and 120 can also have roles that vary by context. For example, at one location or facility, an associate 108 can have a lower-level role while an associate 120 can have a managerial role with respect to the associate 108. At another location or facility, the associate 120 can have a lower-level role while the associate 108 can have a managerial role with respect to the associate 120. In another example, at one time of day (e.g., during a first scheduled shift), an associate 108 can have a lower-level role, while an associate 120 can have a managerial role with respect to the associate 108. At another time of day (e.g., during another scheduled shift), the associate 120 can have a lower-level role, while the associate 108 can have a managerial role with respect to the associate 120.

In some embodiments, a first associate 108 is a car wash attendant and a second associate 120 has a managerial role with respect to the first associate 108. For instance, the second associate 120 is a supervisor. The real-time management system 100 receives one or more electronic schedules 104 including multiple tasks 106 to be completed by the first associate 108 at multiple time intervals 110, where each one of the time intervals 110 is associated with corresponding one(s) of the tasks 106. The electronic schedules 104 and tasks 106 for the first associate 108 are associated with the first associate 108 based upon the role(s) assigned to the first associate 108. For example, a task 106 can be an instruction to a car wash attendant to turn on an air compressor and enter a particular electronic setting for the air compressor. In another example, a task 106 can be an instruction to a car wash attendant to check a Heating, Ventilation, and Air Conditioning (HVAC) filter.

As described, the role of the first associate 108 as a car wash attendant can be dynamically assigned to the first associate 108 based upon a location of the first associate 108 (e.g., presence at a particular facility), a time of day (e.g., a particular shift), and so forth. In some embodiments, a schedule of one or more roles assigned to the first associate 108 is received and/or maintained by the real-time management system 100 (e.g., as described with reference to FIG. 3, where an online schedule for a site allows for automatic assignment of checklists based upon a role assigned to an employee). It should also be noted that the electronic schedules 104 and tasks 106 for the first associate 108 can be dynamically updated based upon location, time of day, and so forth.

For example, a first associate 108 is a cashier. A task 106 can be an instruction to the cashier to count cash in a register when a time interval 110 for the task 106 is at the beginning of a scheduled shift and/or the beginning of a scheduled day (e.g., in the case of a morning cashier checklist). In another instance, a task 106 can be an instruction to the cashier to generate a point of sale (POS) report for a register when a time interval 110 for the task 106 is at the end of a scheduled shift and/or the end of a scheduled day (e.g., in the case of an evening cashier checklist). Tasks 106 can also be assigned to a first associate 108 on a periodic or reoccurring basis (e.g., a payroll task reoccurring on a biweekly basis, a uniform ordering task reoccurring on a quarterly basis, and so forth). Examples of reoccurring intervals for tasks 106 can include, but are not necessarily limited to: daily, weekly, bi-weekly, monthly, annually, and so forth. Automatic notifications associated with these tasks can reduce or eliminate the need for managers to remember to assign non-frequent but important tasks. In some embodiments, the real-time management system 100 reassigns tasks based upon associate availability. For example, tasks 106 assigned to one associate 108 can be automatically reassigned to another associate 108 if the first associate 108 is unavailable (e.g., out sick, on vacation, etc.).

In some embodiments, the real-time management system 100 can update or modify a checklist based upon varying external conditions specific to a site, such as environmental conditions. For example, an application programming interface (API) can be used to determine the temperature and/or weather conditions proximate to the location of a first associate 108 and dynamically update one or more tasks 106 for the first associate 108. The real-time management system 100 can also generate conditional tasks 106 for the first associate 108, e.g., providing instructions specific to a particular employee, specific to a particular job site, based upon feedback or reporting provided by an associate, and so forth. In some embodiments, tasks 106 for the first associate 108 can be expanded upon at the request of an associate. For instance, further instructions may be provided by the real-time management system 100, e.g., at the request of an associate, based upon feedback or reporting provided by an associate, and so on.

Referring now to FIGS. 4 through 7, the real-time management system 100 is configured to initiate a first alert 122 to the electronic device 116 associated with the first associate 108 to notify the first associate 108 of a particular task 106 prior to an expiration of a time interval 110 associated with the task 106. In some embodiments, the first alert 122 to the electronic device 116 also includes an indication of the associated time interval 110 along with the task 106 (e.g., a starting time, an ending time, starting and ending times, duration of time for completion, etc.). In embodiments, the first alert 122 includes a description of the task 106. For example, an alert 122 includes an instruction to order a certain quantity of items of having a particular part number. In some embodiments, the first alert 122 is sent to the electronic device 116 in the form of a checklist 124, e.g., where multiple tasks 106 are collected in a single alert 122.

The first alert 122 can be automatically sent to the electronic device 116 associated with the first associate 108 in the form of an electronic message. For example, an alert 122 can be in the form of a short messaging service (SMS) text message (e.g., as described with reference to FIGS. 6 and 7). However, a text message is provided by way of example and is not meant to limit the present disclosure. In other embodiments, an alert 122 can include other content, including, but not necessarily limited to: an image, multiple images (e.g., a slideshow), audio, video, and/or various combinations of text, images, audio, video, and so forth. For example, in some embodiments, the alert 122 can include a multimedia message, such as a multimedia messaging service (MMS) multimedia message. It should also be noted that an alert 122 can be formatted for delivery using a variety of messaging protocols and/or formats. For example, while text messages and/or multimedia messages are described herein with some specificity, an alert 122 can also be an electronic mail message (e-mail, email), a voice-mail message, an instant message, a fax message, a pager message, and so forth.

In some embodiments, the first alert 122 includes a link 126 to another electronic location or file (e.g., a hyperlink, such as a link from a hypertext file or document), which can be activated by clicking on a highlighted word or image on the screen. In some embodiments, the link 126 directs to a checklist 124. It should be noted that physical reminders or indications of tasks, such as written checklists and/or links to electronic checklists (e.g., quick response (QR) code plaques 146) can be physically present on a job site. In some embodiments, physical indicators 109 of tasks, such as QR code plaques 146 (FIG. 12), can be associated with one or more tasks by the real-time management system 100 so that a presence of the physical indicator in a vicinity occupied by the first associate 108 is configured to provide the first alert 122 to the electronic device 116 associated with the first associate 108. For example, a first associate 108 can access a link 126 via a code displayed on a QR code plaque 146 and navigate to an electronic location or file, such as a checklist 124. In another example, a first associate 108 can access a link 126 via a hyperlink printed on a plaque and navigate to an electronic location or file, such as a checklist 124. In some embodiments, physical reminders and/or indications can be used as a backup if electronic communications are unavailable, e.g., in the case of a system failure, a non-functional electronic device 116, and so forth.

When interfacing with the first alert 122 and/or the checklist 124, the first associate 108 provides an indication of completion and/or non-completion of one or more tasks 106. For example, the first associate 108 provides an electronic indication of the completion of a particular task 106. Based upon receipt and/or non-receipt of the electronic indication from the first associate 108 responsive and/or non-responsive to the first alert 122, the real-time management system 100 is configured to determine the completion and/or non-completion of the task 106. For example, a first associate 108 having the role of cashier is scheduled to work between the hours of 6:00 a.m. and 4:00 p.m. At 6:00 a.m., an alert 122 is sent to the electronic device 116 associated with the cashier (e.g., in the form of a text message) including a checklist 124 and/or a link 126 to a checklist 124 of tasks 106 to be completed by the cashier within the next fifteen (15) minutes, i.e., by 6:15 a.m. If the cashier does not provide an indication that the items on the checklist 124 have been completed within the allotted time, the real-time management system 100 determines the non-completion of one or more of the tasks 106. In some embodiments, an indication of completion of a task may require the submission of one or more images associated with the completion of a task, e.g., to ensure work has been completed. In some embodiments, a first associate 108 can include additional information beyond what is indicated on a checklist 124.

Figures 8, 9:
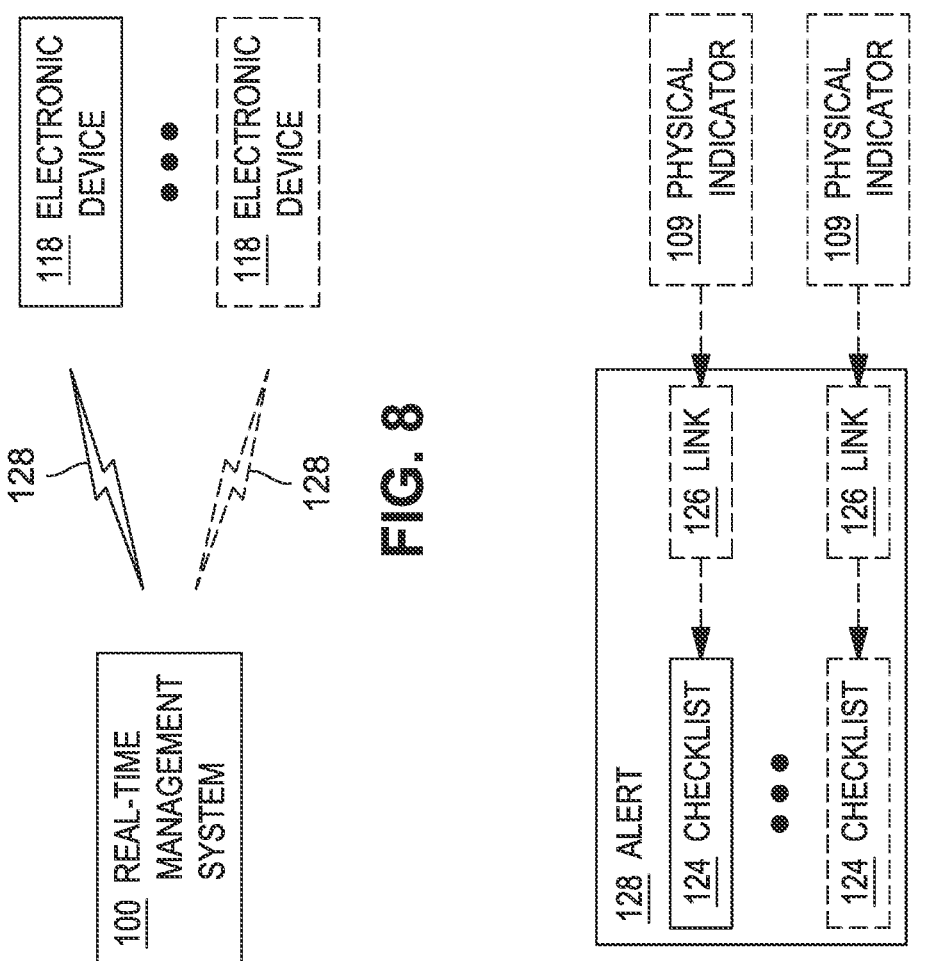
FIG. 8 is a further block diagram of the real-time management system illustrated in FIG. 1.
FIG. 9 is a block diagram illustrating a second alert for a real-time management system, such as the real-time management system illustrated in FIG. 1, in accordance with example embodiments of the present disclosure.
Figure 10:
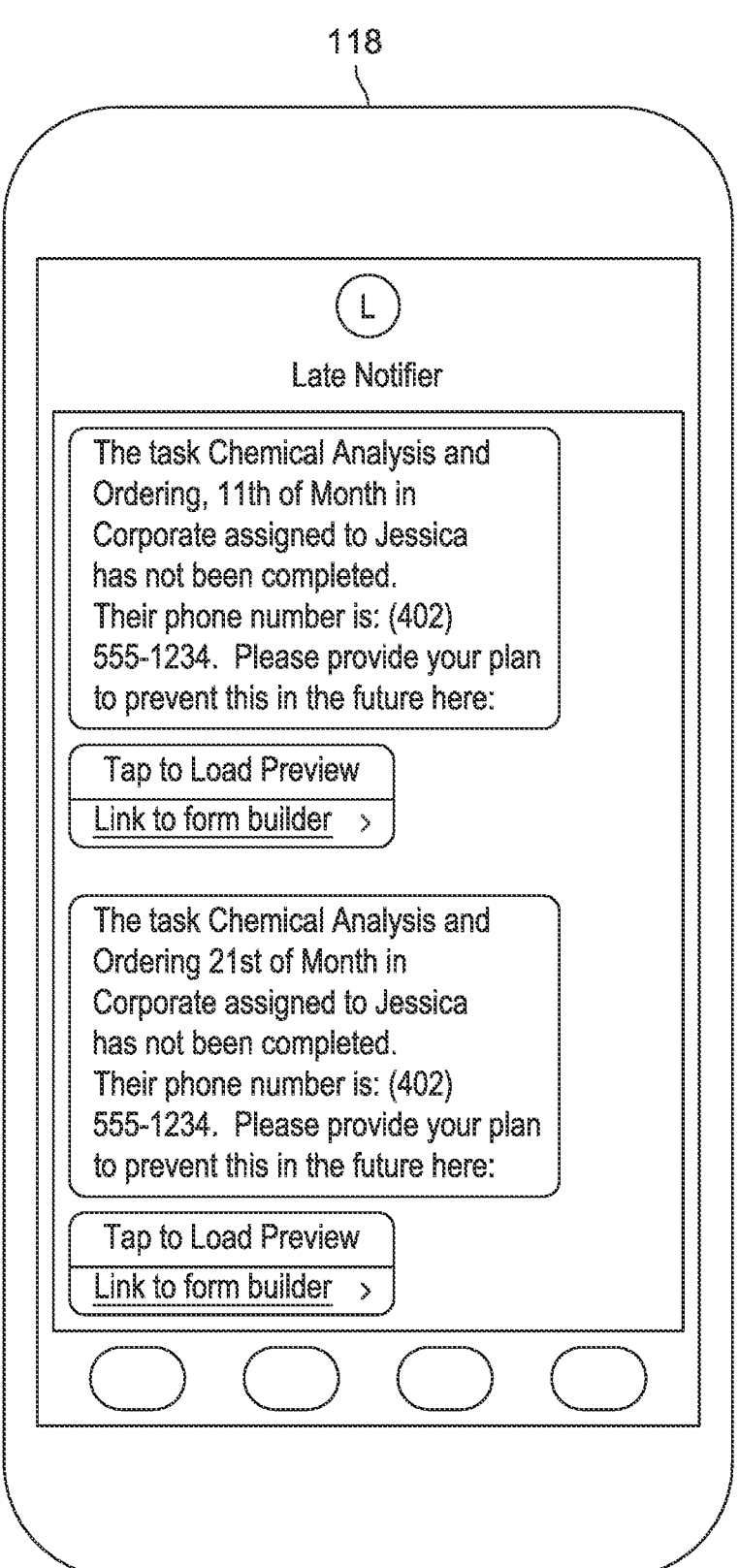
FIG. 10 is a diagrammatic illustration of a user interface with second alerts sent to an electronic device by a real-time management system, such as the real-time management system illustrated in FIG. 1, in accordance with example embodiments of the present disclosure.

With reference to FIGS. 8 through 10, the real-time management system 100 is configured to initiate a second alert 128 to the electronic device 118 associated with the second associate 120 to inform the second associate 120 of a status of a task 106 based upon the completion and/or non-completion of the task 106 by the first associate 108 (e.g., upon expiration of the time interval 110 associated with the task 106). As previously discussed, the second associate 120 has a managerial role with respect to the first associate 108. For example, the role of a second associate 120 as supervisor of the first associate 108 is dynamically assigned to the second associate 120 based upon a location of the second associate 120 (e.g., presence at a particular facility), a time of day (e.g., a particular shift), and so forth. In some embodiments, a schedule of one or more roles assigned to the second associate 120 is received and/or maintained by the real-time management system 100.

Continuing the example above, when the cashier does not provide an indication that one or more items on the checklist 124 have been completed within the allotted time, the real-time management system 100 determines the non-completion of the one or more tasks 106, and a second alert 128 is sent to the electronic device 118 associated with the supervisor (e.g., in the form of a text message). For example, an alert 128 can be sent after 6:15 a.m. In embodiments, the second alert 128 can include an indication of the non-completion of one or more of the tasks 106 assigned to the cashier within the time interval 110 associated with the tasks 106. In some embodiments, the alert 128 includes a description of only a task 106 or tasks 106 which have not been completed within the allotted time (e.g., in the form of a portion of the checklist 124 previously described). In other embodiments, the alert 128 can include an entire checklist 124 (and/or a link 126 to a checklist 124) with an uncompleted task 106 or tasks 106 marked or flagged for the attention of the supervisor. In still further embodiments, the alert 128 includes a description of only a task 106 or tasks 106 which have been completed within the allotted time (e.g., in the form of a portion of the checklist 124 previously described), an entire checklist 124 (and/or a link 126 to a checklist 124) with a completed task 106 or tasks 106 marked or flagged for the attention of the supervisor, and so forth. As described, SMS notifications and weekly email digests for incomplete checklists and tasks can be used to reinforce compliance.

The second alert 128 can be sent to the electronic device 118 associated with the second associate 120 in the form of an electronic message. For example, an alert 128 can be in the form of a short messaging service (SMS) text message. However, a text message is provided by way of example and is not meant to limit the present disclosure. In other embodiments, an alert 128 can include other content, including, but not necessarily limited to: an image, multiple images (e.g., a slideshow), audio, video, and/or various combinations of text, images, audio, video, and so forth. For example, in some embodiments, the alert 128 can include a multimedia message, such as a multimedia messaging service (MMS) multimedia message. It should also be noted that an alert 128 can be formatted for delivery using a variety of messaging protocols and/or formats. For example, while text messages and/or multimedia messages are described herein with some specificity, an alert 128 can also be an electronic mail message (e-mail, email), a voice-mail message, an instant message, a fax message, a pager message, and so forth. In some embodiments, the second alert 128 includes a link 126 to another electronic location or file (e.g., as previously described).

In some embodiments, the link 126 directs to a checklist 124. As described, physical reminders or indications of tasks, such as written checklists and/or links to electronic checklists (e.g., QR code plaques 146) can be physically present on a job site. In some embodiments, physical indicators 109 of tasks, such as QR code plaques 146 (FIG. 12), can be associated with one or more tasks by the real-time management system 100 so that a presence of the physical indicator in a vicinity occupied by the second associate 120 is configured to provide the alert 128 to the electronic device 118 associated with the second associate 120. For example, a second associate 120 can access a link 126 via a code displayed on a QR code plaque 146 and navigate to an electronic location or file, such as a checklist 124. As previously described, physical reminders and/or indications can be used as a backup if electronic communications are unavailable, e.g., in the case of a system failure, a non-functional electronic device 118, and so forth.

Figure 11:
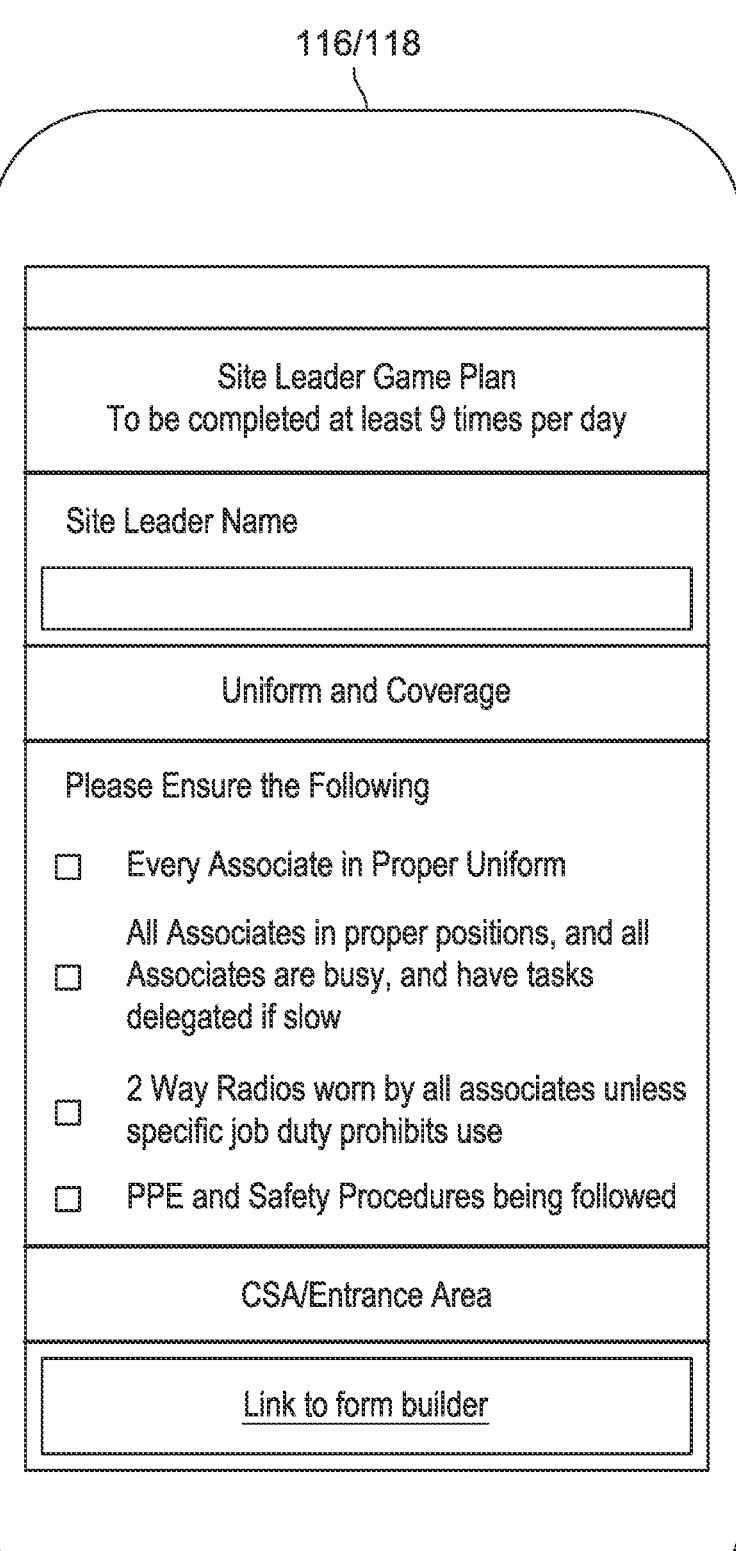
FIG. 11 is a diagrammatic illustration of a user interface with a checklist sent to an electronic device by a real-time management system, such as the real-time management system illustrated in FIG. 1, in accordance with example embodiments of the present disclosure.

Referring now to FIG. 11, a checklist 124 can include multiple tasks 106 collected in a single alert 122. In some embodiments, the checklist 124 can include electronic images illustrating tasks to be completed. In some embodiments, the interface for a checklist 124 can include camera functionality, enabling a first associate 108 to capture electronic images associated with a task 106 or tasks 106 and upload them for the review of a managerial associate. The first associate 108 can flag one or more of the photos to associate the photo(s) with particular tasks 106. As illustrated, a checklist 124 can also have checkboxes and/or other user input fields allowing an associate 108 to indicate status (e.g., completion, non-completion) of particular tasks 106. Checklists 124 can be used to maintain a high level operation, e.g., with hourly completion requirements. The use of the checklists 124 can streamline management into becoming industry leading operators.

In some embodiments, the real-time management system 100 can limit and/or qualify the ability of a first associate 108 to indicate completion of one or more tasks 106. For example, submission of completion can be limited or qualified by geographical location. In some embodiments, positioning data, such as global positioning system (GPS) information obtained and/or determined by an electronic device 116 associated with a first associate 108, can be used to limit the ability of a first associate 108 to indicate completion of a task 106. For instance, if an associate is more than a predetermined distance from a location or locations associated with a particular job site (e.g., outside a geofence), the real-time management system 100 may prevent the associate from indicating completion of a task 106 assigned to be performed at or near the site. In some embodiments, an indication of completion may be allowed by the real-time management system 100, but the indication may be flagged for review by a second association 120 and/or included in a variance sent to the second associate 120 via text message. In the event of a malfunction or unavailability of GPS information, an associate may use an electronic image taken in lieu of GPS information.

In another example, timing data, such as time of day information obtained and/or determined by an electronic device 116 associated with a first associate 108, can be used to limit the ability of a first associate 108 to indicate completion of a task 106. For instance, if an associate indicates completion of a task 106 more than a predetermined amount of time before or after a time interval 110 associated with the task 106, the real-time management system 100 may prevent the associate from indicating completion of the task 106. In some embodiments, an indication of completion may be allowed by the real-time management system 100, but the indication may be flagged for review by a second association 120 and/or included in a variance sent to the second associate 120 via text message. In embodiments of the disclosure, submission times are tracked and notifications (e.g., SMS messages) can be sent to a second associate 120 in case of checklist lateness and/or employee absence. In some embodiments, a real-time management system 100 includes unmodifiable time stamps (e.g., from an electronic device 116) along with indications of completion and/or non-completion of one or more tasks 106.

In a still further example, time duration data, such as timer information obtained and/or determined by an electronic device 116 associated with a first associate 108, can be used to limit the ability of a first associate 108 to indicate completion of a task 106. For instance, if an associate indicates completion of a task 106 less than a predetermined amount of time after receiving and/or reviewing an alert 122 associated with a task 106, the real-time management system 100 may prevent the associate from indicating completion of the task 106. In some embodiments, an indication of completion may be allowed by the real-time management system 100, but the indication may be flagged for review by a second association 120 and/or included in a variance sent to the second associate 120 via text message.

Figure 12:
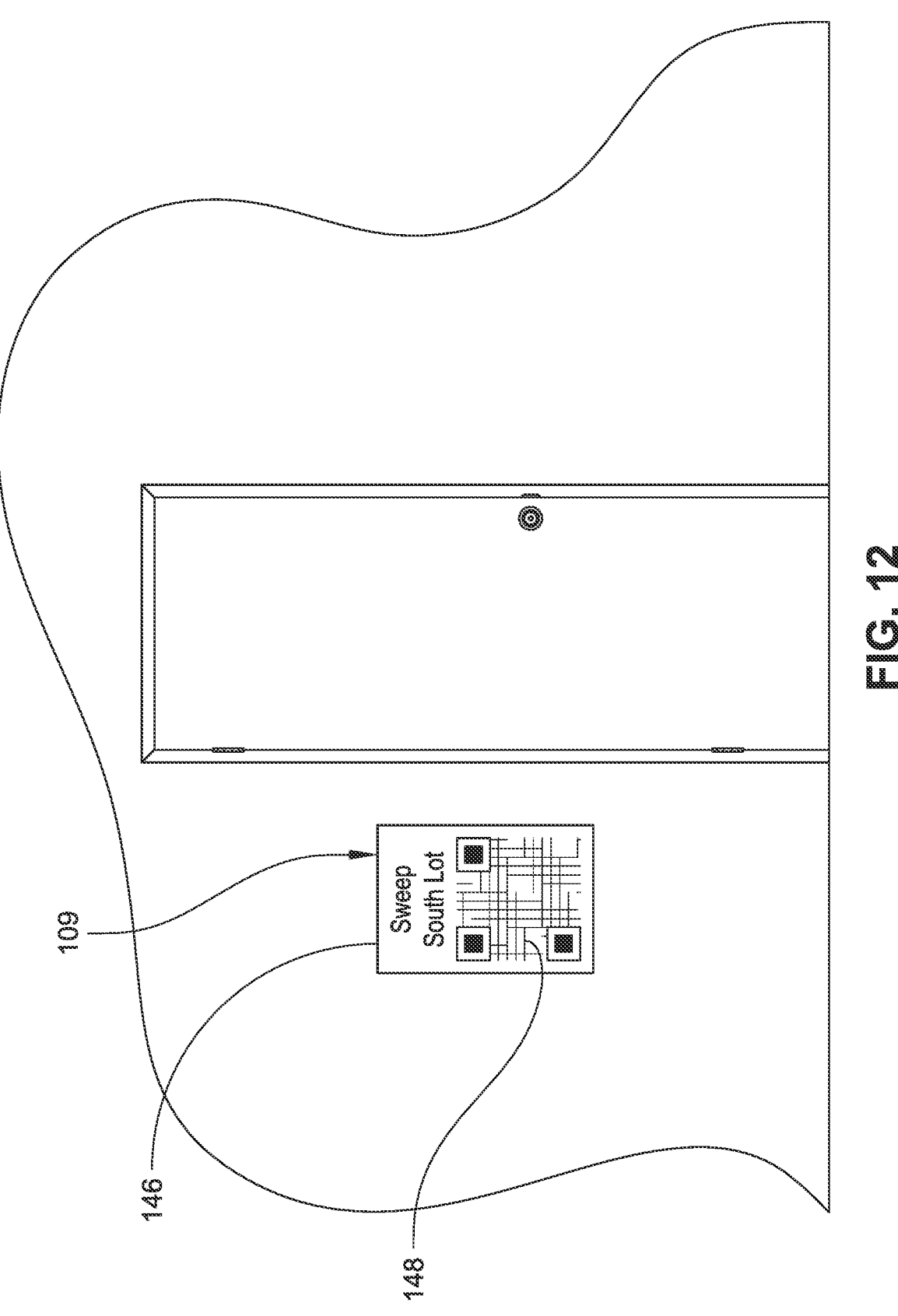
FIG. 12 is a diagrammatic illustration of a QR code plaque for a real-time management system, such as the real-time management system illustrated in FIG. 1, in accordance with example embodiments of the present disclosure.

Referring now to FIG. 12, real-time management systems 100 can be configured to operate with tasks 106 assigned via one or more physical indications (e.g., physical indicators 109) of the tasks physically present on a job site, such as a link to an electronic checklist in the form of a QR code plaque 146. As previously described, a first associate 108 can access a link 126 via a QR code 148 displayed on a QR code plaque 146 and navigate to an electronic location or file. For example, a QR code 148 can direct to a checklist 124. As described, the QR codes 148 can provide easy and physical access to digital to-do checklists. In some embodiments, the QR codes 148 can invisibly pass pre-fill uniform resource locator (URL) parameters to existing and/or custom online checklist programs. The QR codes 148 can be physically placed around a job site near locations for various job duties, e.g., to encourage team members to walk an entire property while completing the duties listed by their checklists. Thus, QR codes 148 and/or other physical indications of tasks can be strategically placed around a facility to ensure property is being maintained regularly, to force a focus of attention onto areas proximate to a QR code 148 or another physical indicator, and so forth. Additionally, lot check items can be displayed for viewing through lot check dashboard links available to management. Additionally, it should be noted that QR codes 148 and/or other physical indicators 109 provide a way for users, such as first associates 108, second associates 120, and so forth, to interact with real-time management systems 100 without managing user access. As previously described, indications such as SMS messages, emails, and so forth can be provided to management if standards are not being upheld.

Figure 13:
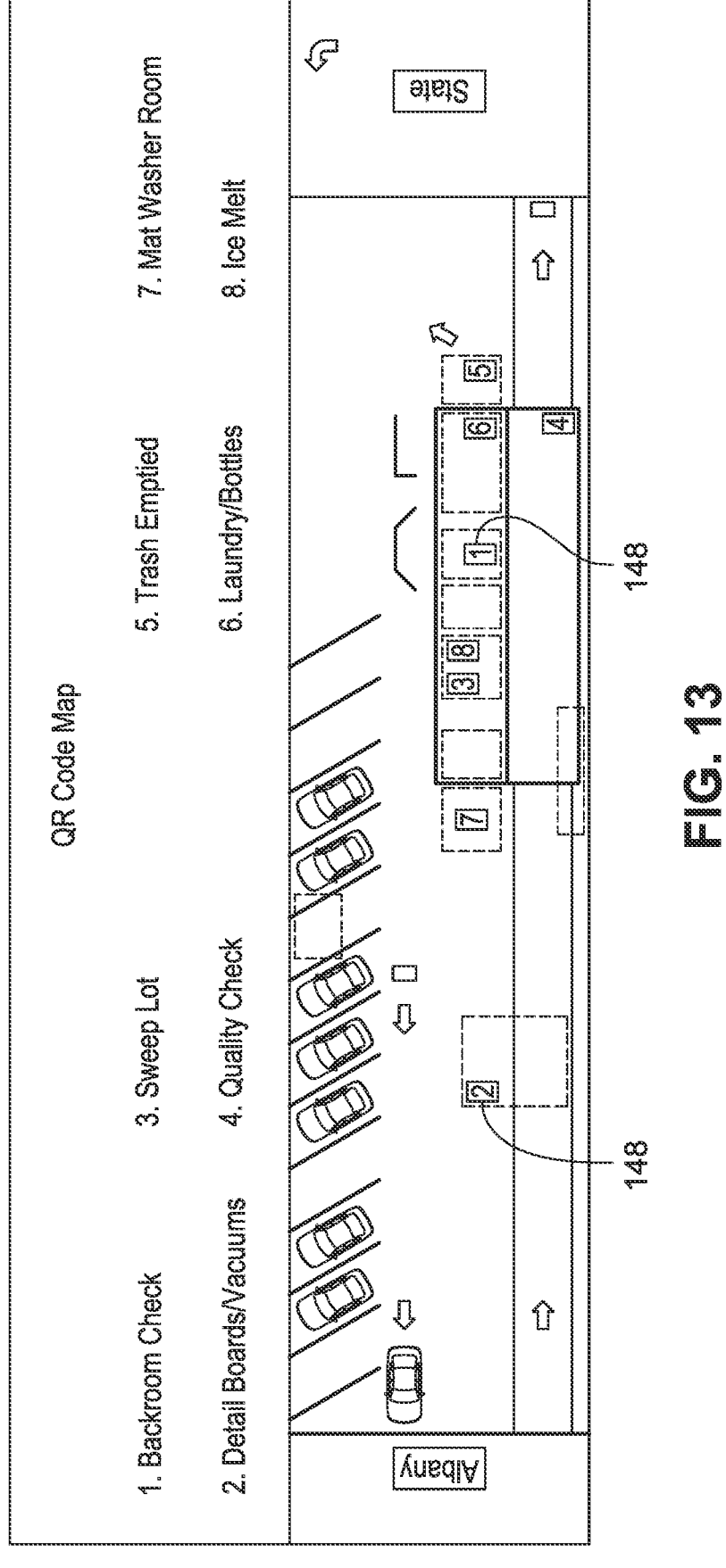
FIG. 13 is a diagrammatic illustration of a user interface with a map displaying QR code locations for a real-time management system, such as the real-time management system illustrated in FIG. 1, where the QR code locations correspond to physical placement of one or more QR codes, in accordance with example embodiments of the present disclosure.

With reference to FIG. 13, a map of physical indications (e.g., QR codes 148) of tasks physically present on a job site can be provided to a first associate 108. The map can be used to order tasks 106 to improve efficiency, achieve a desired order of completion, and so forth. For example, a first associate 108 is a janitor. Ten (10) tasks per hour may be assigned to the janitor, and ten (10) corresponding QR codes 148 may be placed at various locations around a facility associated with duties of the janitor, such as a QR code 148 on a laundry machine, a QR code 148 on a dumpster, a QR code 148 on a spray bottle refill station, and so forth. The janitor can be supplied with a map displaying the location of the various QR codes 148, as well as a recommended, desired, and/or required order of completion for the tasks 106. For example, the map can be displayed to the janitor via one or more user interfaces provided on one or more electronic devices 116 associated with the janitor (e.g., in the janitor's role of first associate 108).

Figure 14A:
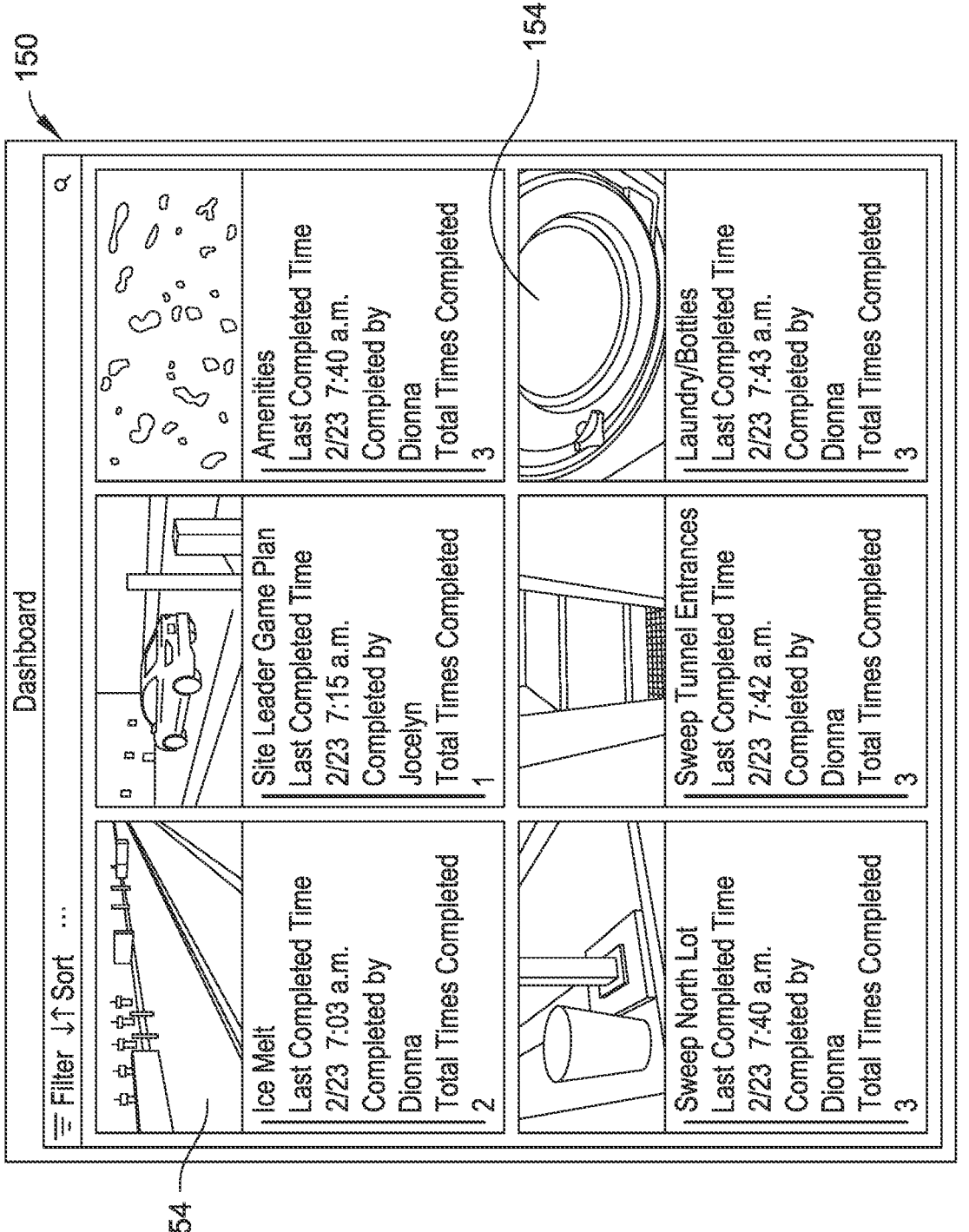
FIG. 14A is a diagrammatic illustration of a user interface with a first portion of a dashboard for a real-time management system, such as the real-time management system illustrated in FIG. 1, in accordance with example embodiments of the present disclosure.
Figure 14B:
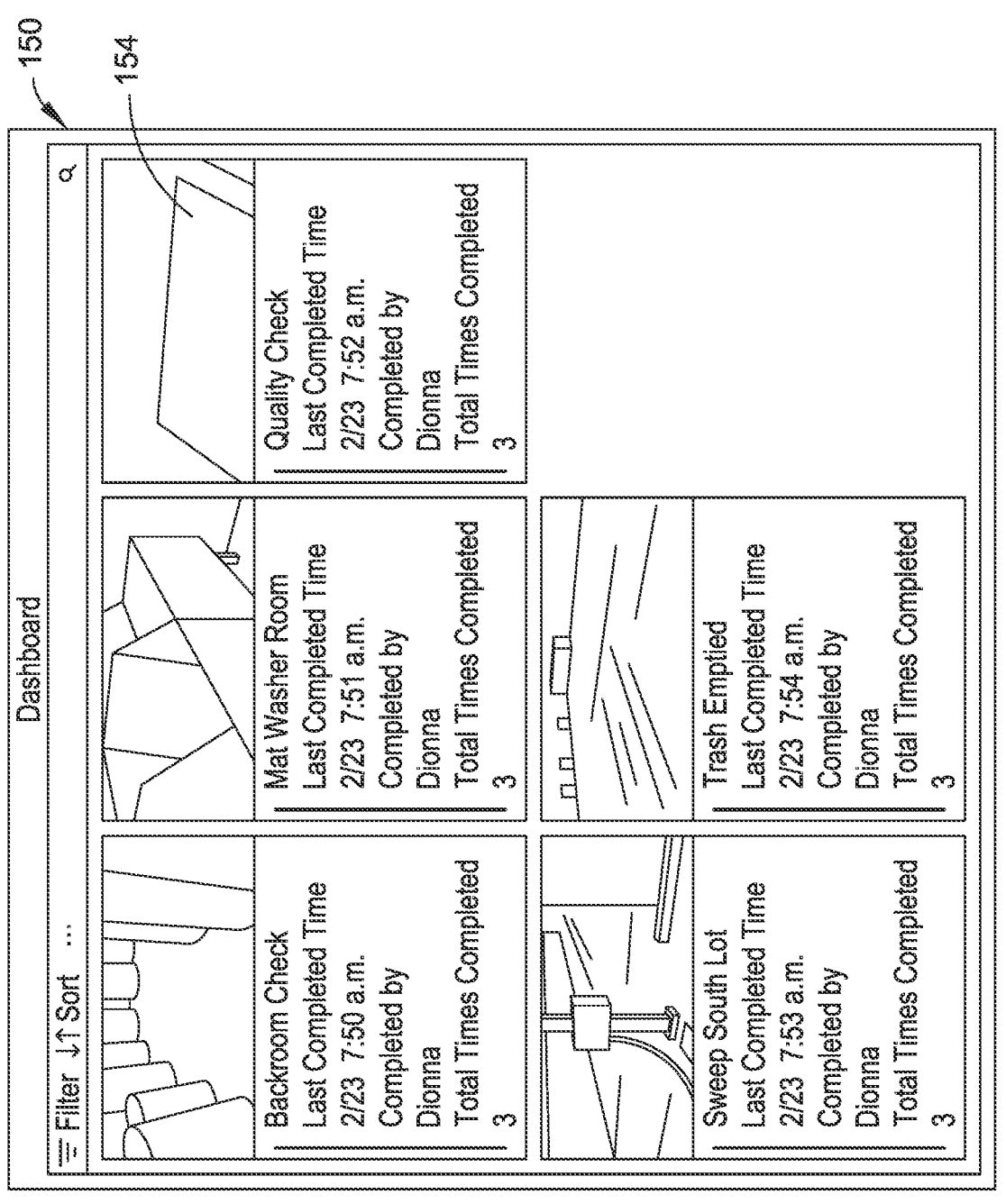
FIG. 14B is a diagrammatic illustration of a user interface with a second portion of a dashboard for a real-time management system, such as the real-time management system illustrated in FIG. 1, in accordance with example embodiments of the present disclosure.
Figure 15:
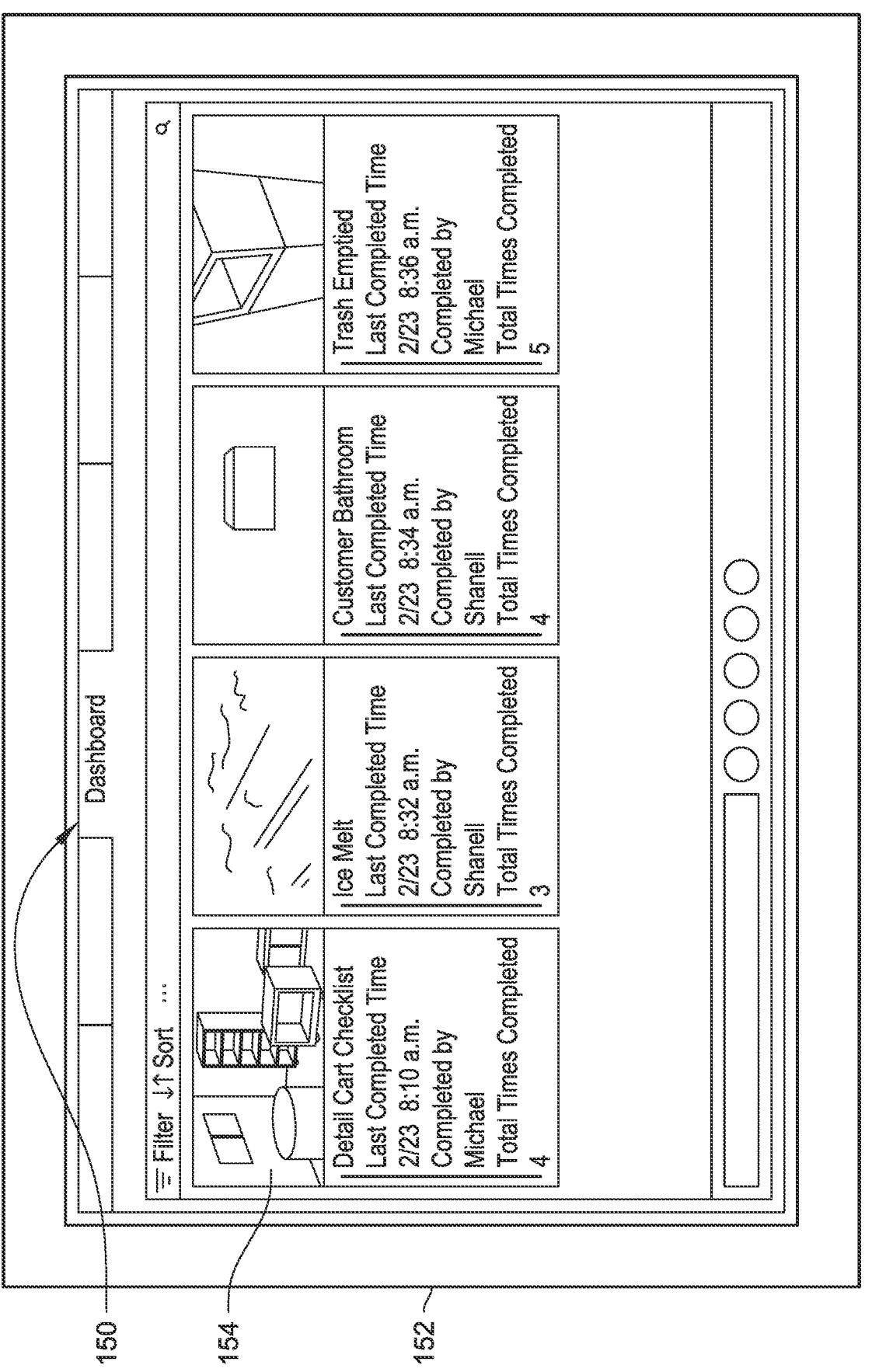
FIG. 15 is a diagrammatic illustration of a dashboard, such as the dashboard illustrated in FIGS. 14A and 14B, physically displayed on a monitor at a job site in accordance with example embodiments of the present disclosure.
Figure 16:
FIG. 16 is a diagrammatic illustration of a social media review for displaying on a dashboard, such as the dashboard illustrated in FIGS. 14A and 14B, in accordance with example embodiments of the present disclosure.

Referring now to FIGS. 14 and 15, a real-time management system 100 can be configured to provide a live electronic dashboard 150. For example, the real-time management system 100 collects business or sales statistics in one or more electronic (e.g., online) databases, such as the database 112. The statistics can be summarized and displayed on-site (e.g., on a monitor 152). In some embodiments, the business statistics, sales statistics, and other data are displayed by the system in real time. The statistics can be refreshed live so that management and employees do not need to collect the information themselves and/or can be constantly informed where a site is doing well and where work may be needed. In some embodiments, photos 154 of recent employee work can be displayed live on a dashboard 150, e.g., as a passive way to ensure work is being completed. The dashboard 150 can also be used to display upcoming tasks 106. With reference to FIG. 16, social media reviews can also be gathered by the real-time management system 100, e.g., using online resources, custom coded software, and so forth, and displayed to team members in real time. The dashboard 150 can be displayed on a physical device, such as a television or monitor in a management and/or employee designated area, such as an office, a break-room, and so forth. The dashboard 150 can also be displayed on an electronic device 116 and/or an electronic device 118. For example, the dashboard 150 can be provided in the form of a text message and/or an email to an electronic device 116 and/or an electronic device 118. In some embodiments, the real-time management system 100 uses the electronic schedules 104 to ensure that live information is displayed for employees currently scheduled to be physically present or on site at a workplace where the information is displayed.

Figure 17:
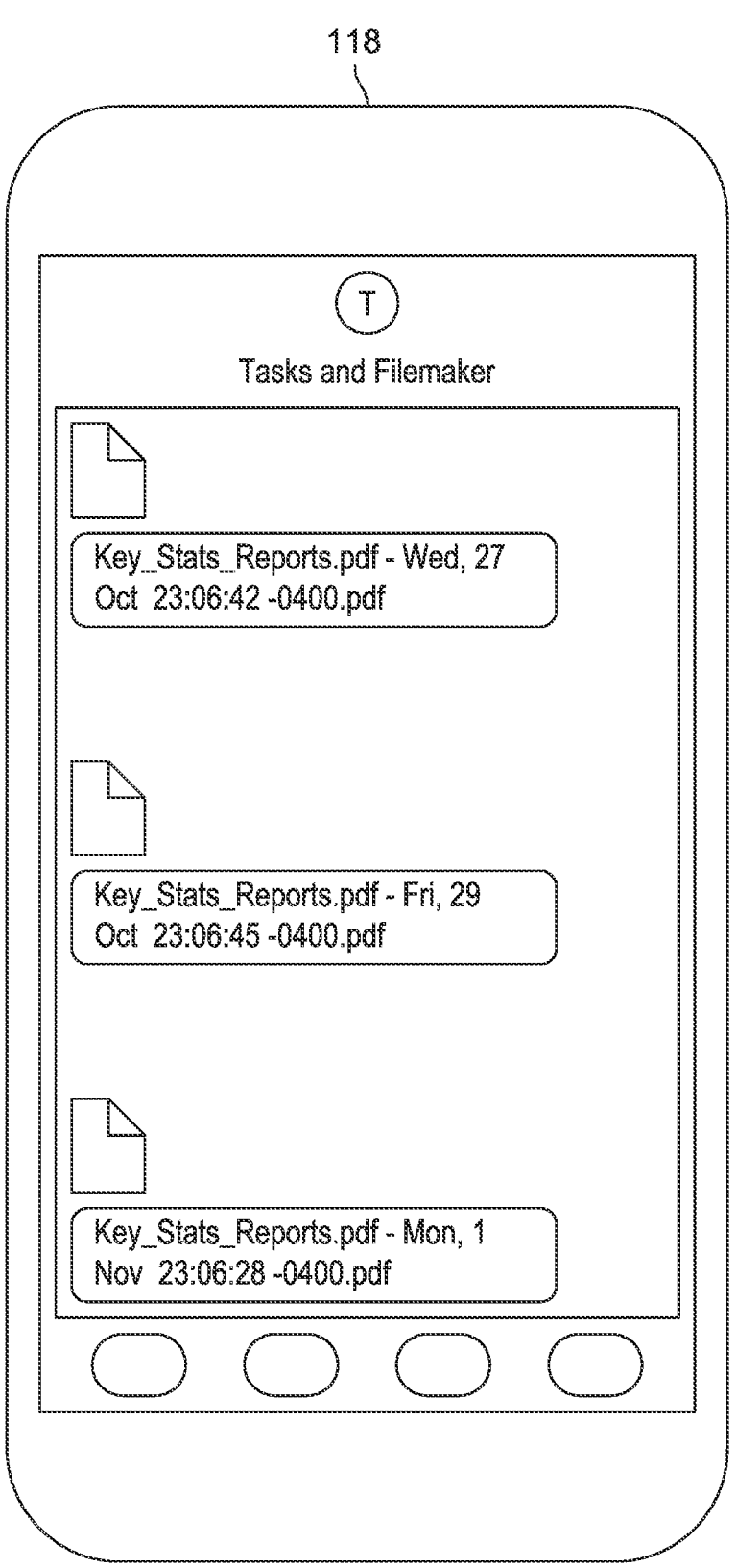
FIG. 17 is a diagrammatic illustration of a user interface with daily sales report notifications for a real-time management system, such as the real-time management system illustrated in FIG. 1, in accordance with example embodiments of the present disclosure.

With reference to FIG. 17, a real-time management system 100 can collect business and/or sales statistics in one or more electronic (e.g., online) databases, such as the database 112. Predetermined goals and parameters can also be set and stored in the real-time management system 100 and used to notify management and/or owners electronically (e.g., via SMS message, automated email reports, etc.) about expectations, e.g., when expectations are not being met. In this manner, management and/or owners can identify where attention is most needed. In some embodiments, a manager or owner can specify to the real-time management system 100 how frequently such notifications are to be provided (e.g., hourly, daily, weekly, and so forth).

Figure 18:
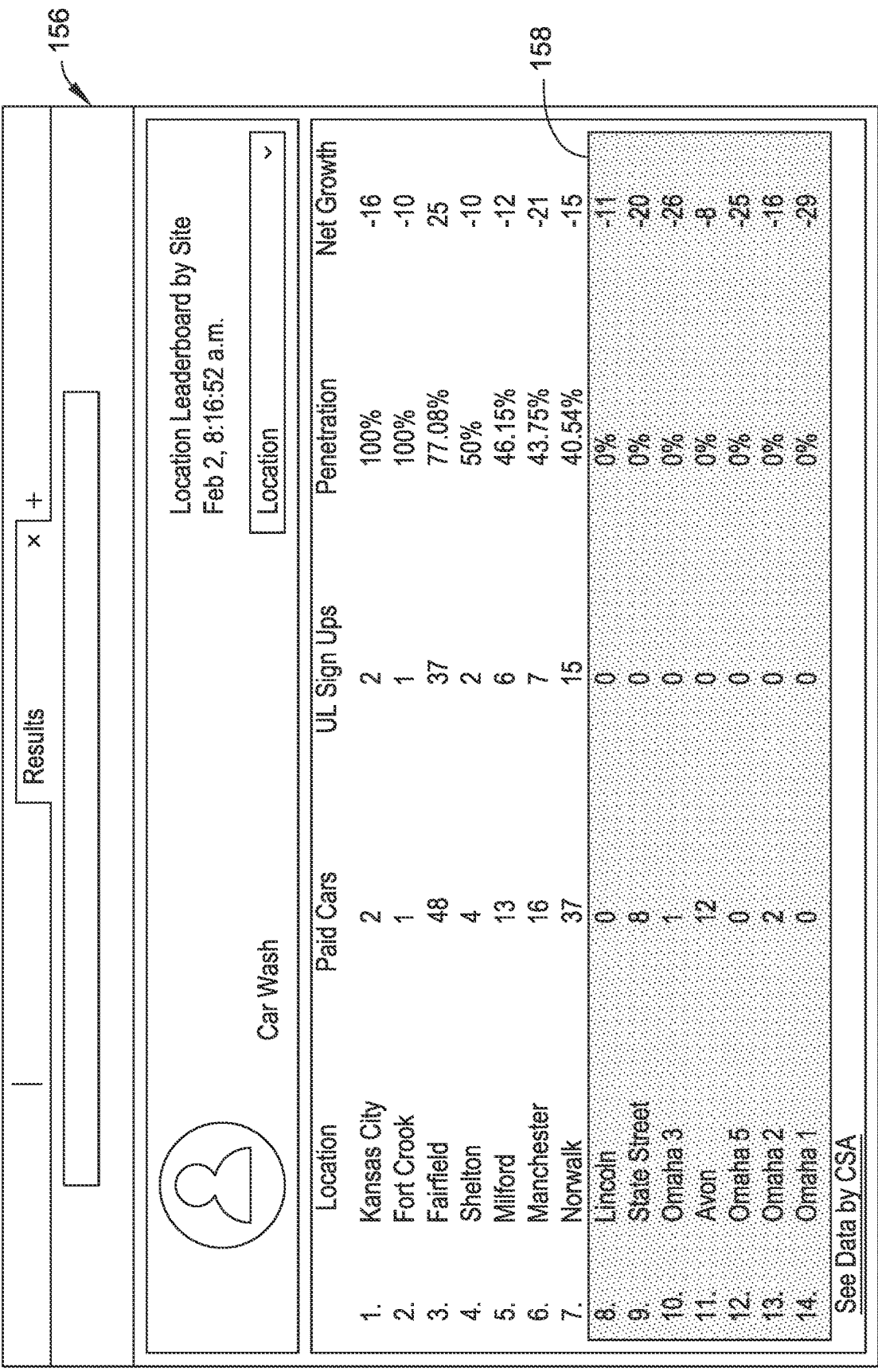
FIG. 18 is a diagrammatic illustration of a user interface with a site leaderboard for a real-time management system, such as the real-time management system illustrated in FIG. 1, in accordance with example embodiments of the present disclosure.
Figure 19:
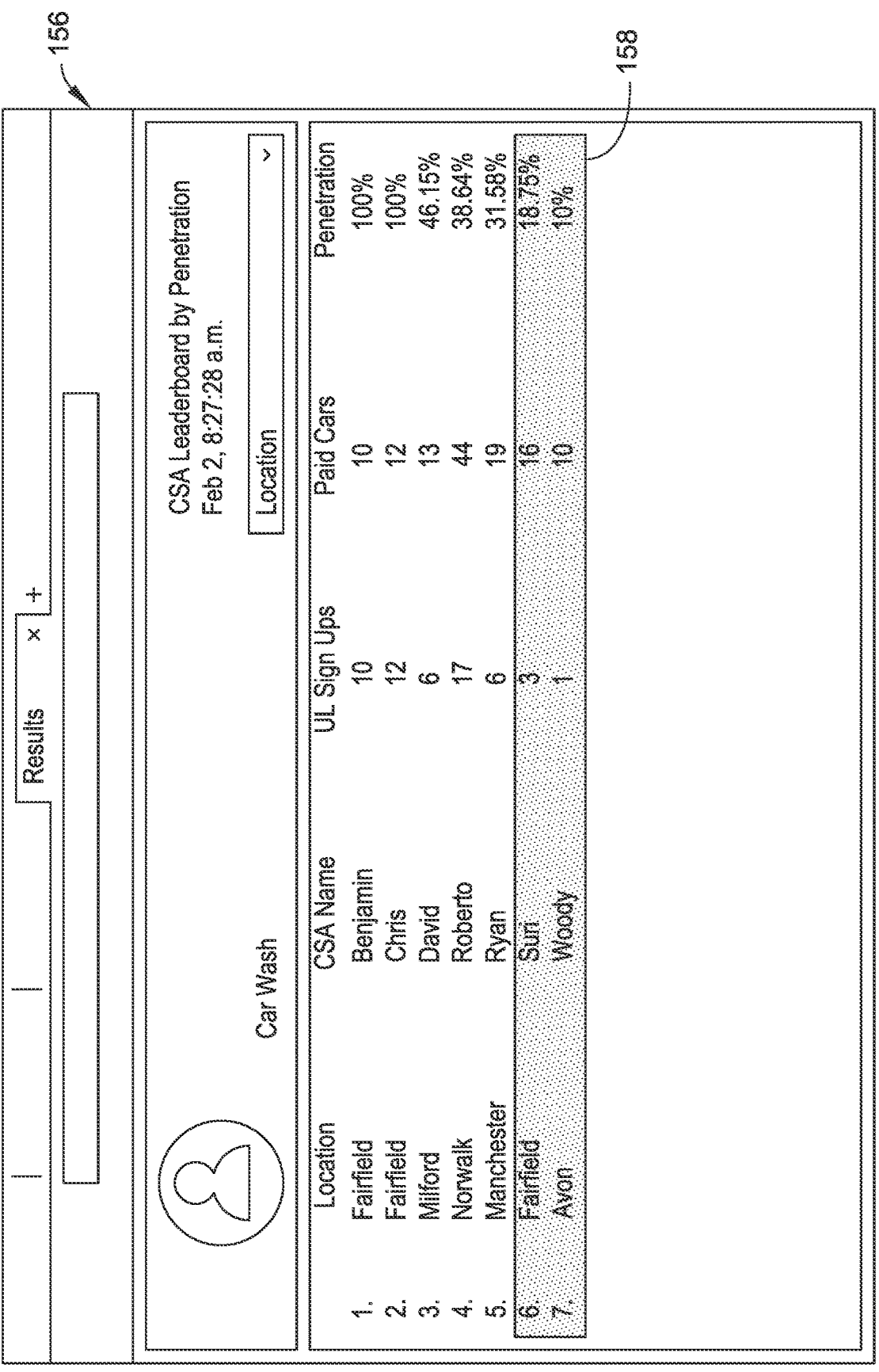
FIG. 19 is a diagrammatic illustration of a user interface with an associate leaderboard for a real-time management system, such as the real-time management system illustrated in FIG. 1, in accordance with example embodiments of the present disclosure.

Referring now to FIGS. 18 and 19, a real-time management system 100 can display sales and/or business statistics between multiple sites, multiple employees, and so forth, e.g., on one or more leaderboards 156. A leaderboard 156 can be automatically refreshed so that employees and management can see live data. In some embodiments, the information can be ordered by performance, e.g., to foster friendly competition between sites and/or employees. This can be a way to implement elements of game playing within a workplace (sometimes referred to as "gamification"). Color coding 158 and/or other visual indications can be used to indicate those who are below predetermined goals, such as goals set by a company or business, e.g., red for sales goals that are not being met, green for sales goals that are being met. In some embodiments, a company goal is set for a particular job site. As described, the real-time management system 100 can notify management and/or owners electronically (e.g., via SMS message) about goals, e.g., when actual sales are not meeting predetermined sales goals or objectives.

Figure 20:
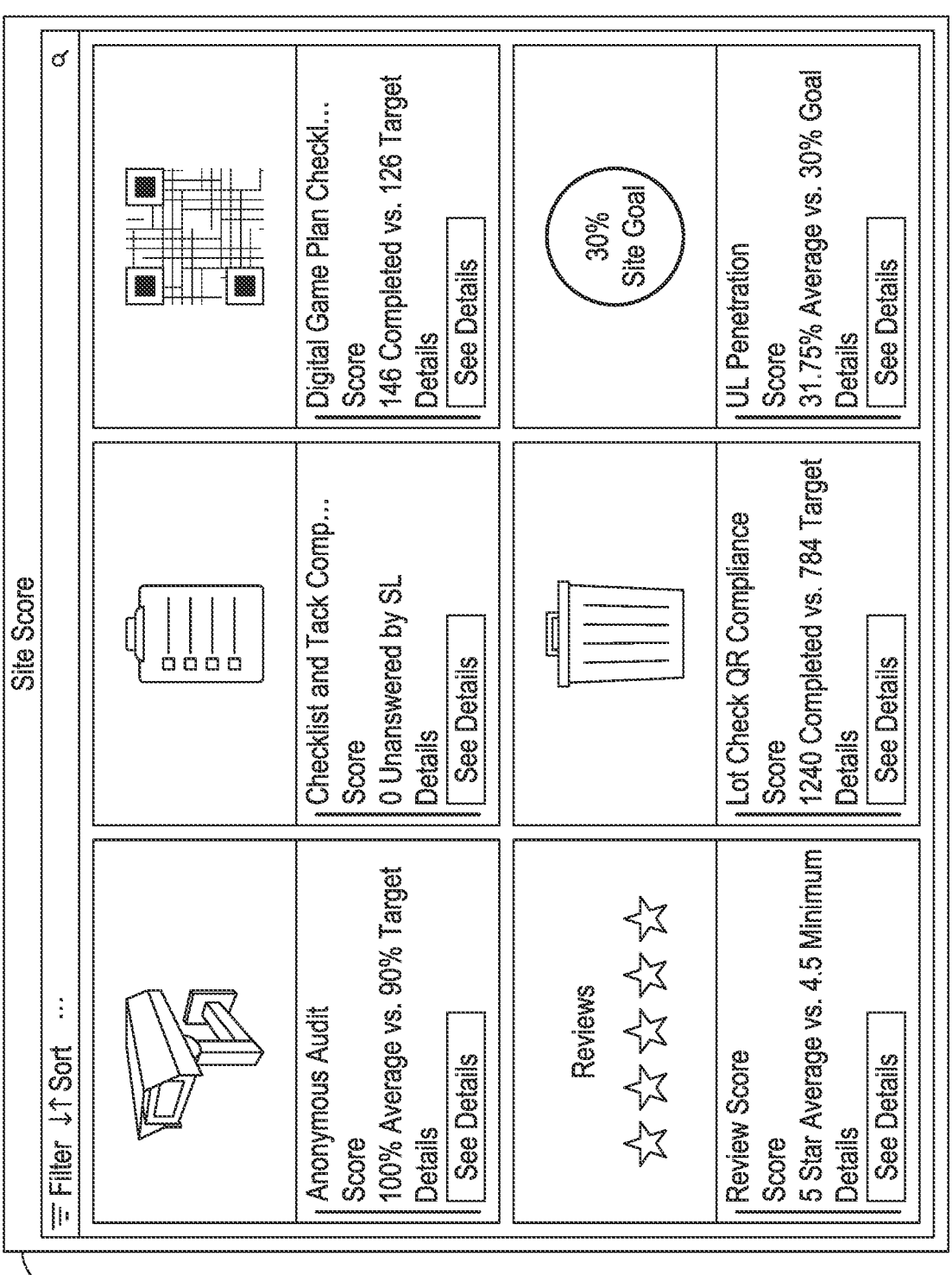
FIG. 20 is a diagrammatic illustration of a user interface with an automated site score for a real-time management system, such as the real-time management system illustrated in FIG. 1, in accordance with example embodiments of the present disclosure.
Figure 21:
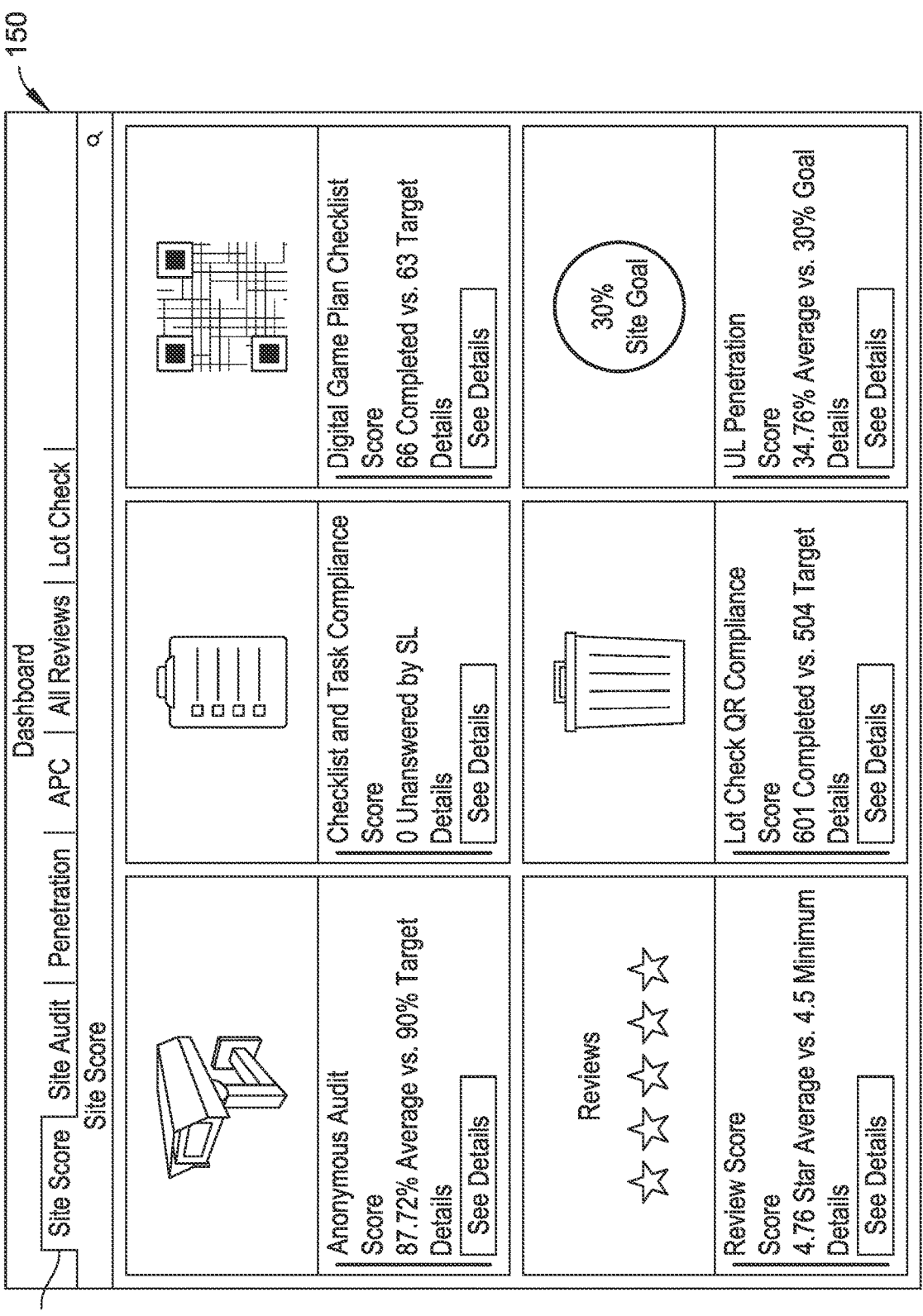
FIG. 21 is a diagrammatic illustration of an automated site score for displaying on a dashboard, such as the dashboard illustrated in FIGS. 14A and 14B, in accordance with example embodiments of the present disclosure.

With reference to FIGS. 20 through 22, the real-time management system 100 provides a live operator interface to implement policies, procedures, and systems to maintain customer experience, operations, and customer perception of a workplace at a high level, while reducing customer friction. Measurement of such aspects can be made available through a site scoring system, where site scoring categories/ key performance indicators measured through automated systems can include, but are not necessarily limited to: anonymous audits for accountability (e.g., via cameras, mystery shoppers), lock check QR compliance (e.g., requiring a certain number of actions per day), digital game plan checklist (e.g., with QR checklists to be completed by a site leader multiple times per day), checklist and task compliance (e.g., for late and/or incomplete checklists and tasks), user lifecycle (UL) penetration (e.g., via point-of-sale information), review score (e.g., via online social media information), maintenance tracking (e.g., via digital checklist), and so forth.

In some embodiments, a live operator interface in the form of a site score 160 can be displayed on a dashboard 150 (e.g., as described with reference to FIGS. 14 and 15). For example, the site score 160 can be displayed on a physical device, such as a television or monitor in a management and/or employee designated area, such as an office, a breakroom, and so forth. The site score 160 can also be displayed on an electronic device 116 and/or an electronic device 118. For example, the site score 160 can be provided in the form of a text message and/or an email to an electronic device 116 and/or an electronic device 118. These automated measurements can provide an unbiased view of how a site is being operated, and site scores can be sent to management and/or owners periodically, e.g., weekly. Using site scoring, the performance of a site's operation can be graded remotely and automatically. The systems, techniques, and apparatus described herein allow management to have a "no effort" tool that can be used to visualize and improve site performance.

An example hierarchical management organizational structure for a real-time management system 100 includes one or more associates, supervisors, assistant managers/site leaders, general managers, district area managers/partners, and owners/operators. As described, a first associate 108 can be a sales associate, and a second associate 120 can be a supervisor having a managerial role with respect to the first associate 108. The real-time management system 100 provides first alerts 122 (e.g., checklists 124 with tasks 106) to an electronic device 116 of the sales associate based upon one or more scheduled roles for the first associate 108 within the organizational structure. The real-time management system 100 provides second alerts 128 to an electronic device 118 of the supervisor, e.g., notifying the supervisor of completion and/or non-completion of one or more of the tasks 106. For instance, second alerts 128 can include variance alerts, incomplete checklists, incomplete tasks, sales information, and so forth.

In another example, a first associate 108 can be the supervisor, and a second associate 120 can be an assistant manager/site leader having a managerial role with respect to the first associate 108. The real-time management system 100 provides first alerts 122 (e.g., checklists 124 with tasks 106) to an electronic device 116 of the supervisor based upon one or more scheduled roles for the first associate 108 within the organizational structure. The real-time management system 100 provides second alerts 128 to an electronic device 118 of the assistant manager/site leader, e.g., notifying the assistant manager/site leader of completion and/or non-completion of one or more of the tasks 106. For instance, second alerts 128 can include variance alerts, incomplete checklists, incomplete tasks, sales information, and so forth.

In a further example, a first associate 108 can be the assistant manager/site leader, and a second associate 120 can be a general manager having a managerial role with respect to the first associate 108. The real-time management system 100 provides first alerts 122 (e.g., checklists 124 with tasks 106) to an electronic device 116 of the assistant manager/site leader based upon one or more scheduled roles for the first associate 108 within the organizational structure. In some embodiments, tasks 106 can include requests for information regarding variance alerts sent to the assistant manager/ site leader, e.g., a request for information about why a task was not performed, a plan for remedying non-completion of a task, and so forth. The real-time management system 100 provides second alerts 128 to an electronic device 118 of the general manager, e.g., notifying the general manager of completion and/or non-completion of one or more of the tasks 106. For instance, second alerts 128 can include variance alerts, incomplete checklists, incomplete tasks, sales information, and so forth.

In a still further example, a first associate 108 can be the general manager, and a second associate 120 can be a district area manager/partner having a managerial role with respect to the first associate 108. The real-time management system 100 provides first alerts 122 (e.g., checklists 124 with tasks 106) to an electronic device 116 of the general manager based upon one or more scheduled roles for the first associate 108 within the organizational structure. In some embodiments, tasks 106 can include requests for information regarding variance alerts sent to the general manager, e.g., a request for information about why a task was not performed, a plan for remedying non-completion of a task, and so forth. The real-time management system 100 provides second alerts 128 to an electronic device 118 of the district area manager/partner, e.g., notifying the district area manager/partner of completion and/or non-completion of one or more of the tasks 106. For instance, second alerts 128 can include sales variances by site, a site score for a pay period, notification of a performance-based bonus, and so forth.

In another example, a first associate 108 can be the district area manager/partner, and a second associate 120 can be an owner/operator having a managerial role with respect to the first associate 108. The real-time management system 100 can provide first alerts 122 to an electronic device 116 of the district area manager/partner based upon one or more scheduled roles for the first associate 108 within the organizational structure. The real-time management system 100 provides second alerts 128 to an electronic device 118 of the owner/ operator, e.g., notifying the owner/operator of completion and/or non-completion of one or more of the tasks 106. For instance, second alerts 128 can include all sales variances, a site score for a pay period, periodic (e.g., weekly) notifications of historical trends, and so forth.

Figure 23:
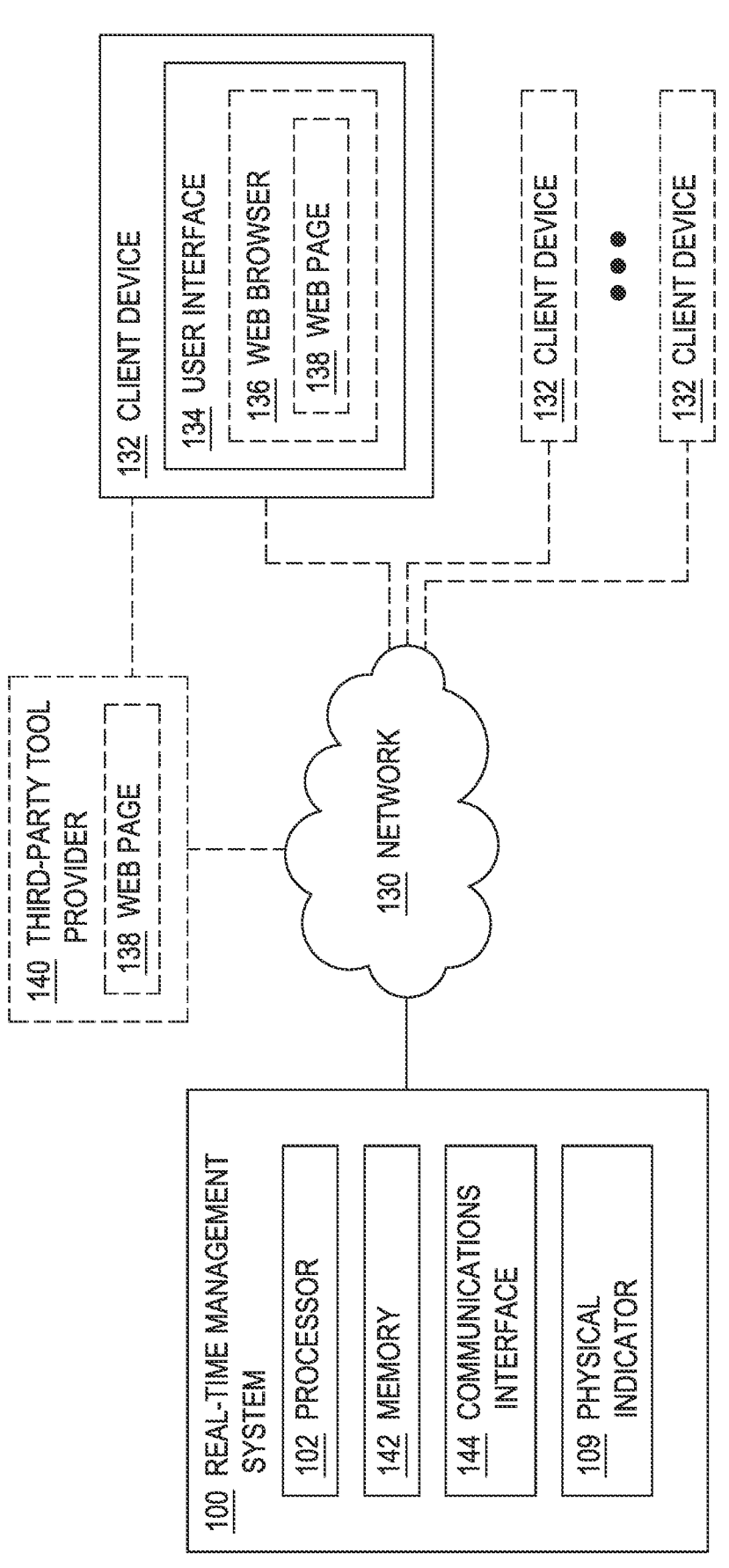
FIG. 23 is a block diagram illustrating a real-time management system providing a live operator interface for a hierarchical management organizational structure in accordance with example embodiments of the present disclosure.

Referring now to FIG. 23, the real-time management system 100 is configured to connect to a network 130 and provide one or more client devices 132 with a user interface 134. The user interface 134 is configured to provide one or more interfaces for scheduling and assigning tasks to associates (e.g., as described with reference to FIG. 3), first alerts for a first associate (e.g., as described with reference to FIGS. 6 and 7), second alerts for a second associate (e.g., as described with reference to FIG. 10), checklists (e.g., as described with reference to FIGS. 11 and 12), maps displaying locations of physical indicators (e.g., as described with reference to FIG. 13), dashboards (e.g., as described with reference to FIGS. 14 and 15), social media reviews (e.g., as described with reference to FIG. 16), sales report notifications (e.g., as described with reference to FIG. 17), site leaderboards (e.g., as described with reference to FIG. 18), associate leaderboards (e.g., as described with reference to FIG. 19), automated site scores (e.g., as described with reference to FIGS. 20 and 21), details of automated site scores (e.g., as described with reference to FIG. 22), and so forth.

A client device 132 can be an information handling system device, including, but not necessarily limited to: a mobile computing device (e.g., a hand-held portable computer, a personal digital assistant (PDA), a laptop computer, a netbook computer, a tablet computer, and so forth), a mobile telephone device (e.g., a cellular telephone, a smartphone), a device that includes functionalities associated with smartphones and tablet computers (e.g., a phablet), a portable game device, a portable media player device, a multimedia device, an e-book reader device (eReader), a smart television (TV) device, a surface computing device (e.g., a table top computer), a personal computer (PC) device, and so forth. One or more client devices 132 can be an electronic device 116 associated with a first associate 108, an electronic device 118 associated with a second associate 120, and so forth. First and second associates 108 and 120 can communicate with the real-time management system 100 via the client devices 132.

In some embodiments, a real-time management system 100 provides on demand software, e.g., in the manner of software as a service (SaaS) distributed to a client device 132 via the network 130 (e.g., the Internet). For example, a real-time management system 100 hosts real-time management software and associated data in the cloud. The software is accessed by the client device 132 with a thin client (e.g., via a web browser 136). The first and second associates 108 and 120 interface with the software (e.g., a web page 138) provided by the real-time management system 100 via the user interface 134 (e.g., using web browser 136). In embodiments of the disclosure, the real-time management system 100 communicates with a client device 132 using an application protocol, such as hypertext transfer protocol (HTTP). In some embodiments, the real-time management system 100 provides a client device 132 with a user interface 134 accessed using a web browser 136 and displayed on a monitor and/or a mobile device. Web browser form input can be provided using a hypertext markup language (HTML) and/or extensible HTML (XHTML) format, and can provide navigation to other web pages (e.g., via hypertext links). The web browser 136 can also use other resources such as style sheets, scripts, images, and so forth.

In other embodiments, content is served to a client device 132 using another application protocol. For instance, a third-party tool provider 140 (e.g., a tool provider not operated and/or maintained by a real-time management system 100) can include content from a real-time management system 100 (e.g., embedded in a web page 138 provided by the third-party tool provider 140). It should be noted that a thin client configuration for the client device 132 is provided by way of example only and is not meant to limit the present disclosure. In other embodiments, the client device 132 is implemented as a thicker (e.g., fat, heavy, rich) client. For example, the client device 132 provides rich functionality independently of the real-time management system 100. In some embodiments, one or more cryptographic protocols are used to transmit information between a real-time management system 100 and a client device 132 and/or a third-party tool provider 140. Examples of such cryptographic protocols include, but are not necessarily limited to: a transport layer security (TLS) protocol, a secure sockets layer (SSL) protocol, and so forth. For instance, communications between a real-time management system 100 and a client device 132 can use HTTP secure (HTTPS) protocol, where HTTP protocol is layered on SSL and/or TLS protocol.

Techniques in accordance with the present disclosure can be used to implement cloud-based systems. For the purposes of the present disclosure, the terms cloud-based and cloud computing are used to refer to a variety of computing concepts, generally involving a large number of computers connected through a real-time communication network, such as the Internet. However, cloud computing is provided by way of example only and is not meant to limit the present disclosure. The techniques described herein can be used in various computing environments and architectures including, but not necessarily limited to, client-server architectures where distributed applications are implemented by service providers (servers) and service requesters (clients), peer-to-peer architectures where participants are both suppliers and consumers of resources, and so forth.

A real-time management system 100, including some or all of its components, can operate under computer control. For example, one or more processors 102 can be included with or in a real-time management system 100 to control the components and functions of real-time management systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the real-time management systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A processor 102 provides processing functionality for the real-time management system 100 and can include any number of processors, micro-controllers, or other processing systems, and resident or external memory for storing data and other information accessed or generated by the real-time management system 100. The processor 102 can execute one or more software programs that implement techniques described herein. The processor 102 is not limited by the materials from which it is formed or the processing mechanisms employed therein and, as such, can be implemented via semiconductor(s) and/or transistors (e.g., using electronic integrated circuit (IC) components), and so forth.

The real-time management system 100 includes one or more memories 142. A memory 142 is an example of tangible, computer-readable storage medium that provides storage functionality to store various data associated with operation of the real-time management system 100, such as software programs and/or code segments, or other data to instruct the processor 102, and possibly other components of the real-time management system 100, to perform the functionality described herein. Thus, the memory 142 can store data, such as a program of instructions for operating the real-time management system 100 (including its components), and so forth. It should be noted that while a single memory 142 is described, a wide variety of types and combinations of memory (e.g., tangible, non-transitory memory) can be employed. The memory 142 can be integral with the processor 102, can comprise stand-alone memory, or can be a combination of both.

The memory 142 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the real-time management system 100 and/or the memory 142 can include removable integrated circuit card (ICC) memory, such as memory provided by a subscriber identity module (SIM) card, a universal subscriber identity module (USIM) card, a universal integrated circuit card (UICC), and so on.

The real-time management system 100 includes one or more communications interfaces 144. A communications interface 144 is operatively configured to communicate with components of the real-time management system 100. For example, the communications interface 144 can be configured to transmit data for storage in the real-time management system 100, retrieve data from storage in the real-time management system 100, and so forth. The communications interface 144 is also communicatively coupled with the processor 102 to facilitate data transfer between components of the real-time management system 100 and the processor 102 (e.g., for communicating inputs to the processor 102 received from a device communicatively coupled with the real-time management system 100). It should be noted that while the communications interface 144 is described as a component of a real-time management system 100, one or more components of the communications interface 144 can be implemented as external components communicatively coupled to the real-time management system 100 via a wired and/or wireless connection. The real-time management system 100 can also comprise and/or connect to one or more input/output (I/O) devices (e.g., via the communications interface 144), including, but not necessarily limited to: a display, a mouse, a touchpad, a keyboard, and so on.

The communications interface 144 and/or the processor 102 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 144 can be configured to communicate with a single network or multiple networks across different access points.

Referring now to FIG. 24, a process 200 for providing real-time management for an organization is depicted in accordance with example embodiments, e.g., as described with reference to the real-time management systems 100 discussed above with reference to FIGS. 1 through 23. In the process illustrated, an electronic schedule including at least one task to be completed by a first associate in a time interval is received (Block 210). For example, a real-time management system 100 includes one or more processors 102 configured to receive one or more electronic schedules 104 including multiple tasks 106 to be completed by one or more first associates 108 at multiple time intervals 110. Electronic contact information for a first electronic device associated with the first associate and electronic contact information for a second electronic device associated with a second associate having a managerial role with respect to the first associate are stored (Block 220). For instance, real-time management systems 100 include one or more databases 112 with electronic contact information 114 for electronic devices 116 associated with the first associates 108 and electronic devices 118 associated with one or more second associates 120, where one or more of the second associates 120 has a managerial role with respect to one or more of the first associates 108.

A first alert is initiated to the first electronic device using the electronic contact information for the first electronic device associated with the first associate to notify the first associate of the task to be completed by the first associate prior to an expiration of the time interval associated with the task (Block 230). For example, a real-time management system 100 is configured to initiate a first alert 122 to the electronic device 116 associated with the first associate 108 to notify the first associate 108 of a particular task 106 prior to an expiration of a time interval 110 associated with the task 106. The first alert 122 to the electronic device 116 can include an indication of the associated time interval 110 along with the task 106 (e.g., a starting time, an ending time, starting and ending times, duration of time for completion, etc.). The first alert 122 can also include a description of the task 106 (e.g., an instruction to order a certain quantity of items of having a particular part number). The first alert 122 can be sent to the electronic device 116 in the form of a checklist 124, e.g., where multiple tasks 106 are collected in a single alert 122.

At least one of a completion or a non-completion of the task is determined based upon a receipt or a non-receipt of an electronic indication from the first associate responsive or non-responsive to the first alert (Block 240). For instance, when interfacing with the first alert 122 and/or the checklist 124, the first associate 108 provides an indication of completion and/or non-completion of one or more tasks 106. The first associate 108 can provide an electronic indication of the completion of a particular task 106 in the form of checking an item on a checklist 124, sending a text message, sending an email message, providing a photograph, etc. Based upon receipt and/or non-receipt of the electronic indication from the first associate 108 responsive and/or non-responsive to the first alert 122, the real-time management system 100 is configured to determine the completion and/or non-completion of the task 106.

Based upon the completion or the non-completion of the task by the first associate, a second alert is initiated to the second electronic device associated with the second associate using the electronic contact information for the second electronic device to inform the second associate of a status of the task (Block 250). For example, the real-time management system 100 is configured to initiate a second alert 128 to the electronic device 118 associated with the second associate 120 to inform the second associate 120 of a status of a task 106 based upon the completion and/or non-completion of the task 106 by the first associate 108 (e.g., upon expiration of the time interval 110 associated with the task 106). As previously described, the second alert 128 can include one or more site scores 160 associated with the task to be completed by the first associate 108 in the vicinity of the physical indicator 109. A site score 160 can be displayed on a dashboard 150, provided as a text message to an electronic device 118, provided as an email to an electronic device 118, and so forth.

In some embodiments, a physical indicator of the task is associated with the task, such that, responsive to a presence of the physical indicator in a vicinity occupied by the first associate, the first electronic device associated with the first associate provides the first alert to the first electronic device associated with the first associate (Block 260). For instance, physical indicators 109 of tasks, such as QR code plaques 146, can be associated with one or more tasks by the real-time management system 100 so that a presence of the physical indicator in a vicinity occupied by the first associate 108 is configured to provide the first alert 122 to the electronic device 116 associated with the first associate 108. For example, a first associate 108 can access a link 126 via a code displayed on a QR code plaque 146 and navigate to an electronic location or file, such as a checklist 124.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A real-time management system comprising:

one or more processors configured to receive an electronic schedule including a plurality of tasks assigned to be completed at a worksite by at least one first associate at a plurality of time intervals, each one of the plurality of time intervals associated with a corresponding one of the plurality of tasks, each one of the plurality of tasks assigned to the at least one first associate based upon a role assigned to the at least one first associate;

one or more databases including electronic contact information for a first electronic device associated with the at least one first associate, a second electronic device associated with at least one second associate, and a third electronic device associated with at least one third associate, the one or more databases further including a schedule of roles for the at least one first associate, the at least one second associate, and the at least one third associate, where the roles are dynamically assignable to the at least one first associate, the at least one second associate, and the at least one third associate so that the at least one second associate has a managerial role with respect to the at least one first associate, and the at least one third associate has a managerial role with respect to the at least one second associate during the plurality of time intervals;

one or more communications interfaces configured to initiate electronic communications with the first electronic device, the second electronic device, and the third electronic device;

one or more memories having computer executable instructions stored thereon, the computer executable instructions configured for execution by the one or more processors to:

initiate, via the one or more communications interfaces and using the electronic contact information for the first electronic device associated with the at least one first associate, a first alert to the first electronic device to notify the at least one first associate of a particular task of the plurality of the tasks to be completed by the first associate prior to an expiration of a time interval associated with the task, the first alert including the time interval associated with the task, determine at least one of a completion or a non-completion of the particular task, based upon a receipt or a non-receipt of an electronic indication from the at least one first associate responsive or non-responsive to the first alert, based upon the completion or the non-completion of the particular task by the at least one first associate, initiate, via the one or more communications interfaces and using the electronic contact information for the second electronic device associated with the at least one second associate, a second alert to the second electronic device to inform the at least one second associate of a status of the particular task, determine, based at least in part upon the completion or the non-completion of the particular task by the at least one first associate, a variance for the worksite, when non-completion of the particular task by the at least one first associate is determined, initiate, via the one or more communications interfaces and using the electronic contact information for the second electronic device associated with the at least one second associate, a third alert to the second electronic device to notify the at least one second associate of the variance for the worksite and request additional information about the non-completion of the task, the third alert including a time interval associated with the request, determine at least one of a completion or a non-completion of the request, based upon a receipt or a non-receipt of an electronic indication from the at least one second associate responsive or non-responsive to the third alert, and based upon the completion or the non-completion of the request by the at least one second associate, initiate, via the one or more communications interfaces and using the electronic contact information for the third electronic device associated with the at least one third associate, a fourth alert to the third electronic device to inform the at least one third associate of a status of the request; and a physical indicator of at least one task of the plurality of tasks, the physical indicator associated with the at least one task by the one or more processors such that responsive to a presence of the physical indicator at a site where the at least one task is to be completed and where the at least one first associate is present, the first electronic device associated with the at least one first associate is configured to provide the first alert to the first electronic device associated with the at least one first associate, wherein the at least one task of the plurality of tasks is a task that is physically present at the site associated with the physical indicator and is associated with the physical indicator based upon its presence at the site.

2. The real-time management system as recited in claim 1, wherein the physical indicator is a quick response (QR) code.

3. The real-time management system as recited in claim 2, wherein the QR code is displayed on a plaque.

4. The real-time management system as recited in claim 1, wherein at least one of the first alert or the second alert comprises a checklist.

5. The real-time management system as recited in claim 1, wherein the second alert comprises at least one site score associated with the particular task to be completed by the at least one first associate at the site associated with the physical indicator.

6. The real-time management system as recited in claim 5, wherein the site score is provided to the second electronic device in the form of at least one of a text message or an email message.

7. A method for implementing real-time management for an organization, the method comprising:

receiving an electronic schedule including a plurality of tasks assigned to be completed at a worksite by at least one first associate at a plurality of time intervals, each one of the plurality of time intervals associated with a corresponding one of the plurality of tasks, each one of the plurality of tasks assigned to the at least one first associate based upon a role assigned to the at least one first associate;

storing, via one or more databases, electronic contact information for a first electronic device associated with the at least one first associate, a second electronic device associated with at least one second associate, and a third electronic device associated with at least one third associate;

storing, via the one or more databases, a schedule of roles for the at least one first associate, the at least one second associate, and the at least one third associate, where the roles are dynamically assignable to the at least one first associate, the at least one second associate, and the at least one third associate so that the at least one second associate has a managerial role with respect to the at least one first associate, and the at least one third associate has a managerial role with respect to the at least one second associate during the plurality of time intervals;

initiating, via one or more communications interfaces and using the electronic contact information for the first electronic device associated with the at least one first associate, a first alert to the first electronic device to notify the at least one first associate of a particular task of the plurality of the tasks to be completed by the first associate prior to an expiration of a time interval associated with the task;

determining at least one of a completion or a non-completion of the particular task, based upon a receipt or a non-receipt of an electronic indication from the at least one first associate responsive or non-responsive to the first alert;

based upon the completion or the non-completion of the particular task by the at least one first associate, initiating, via the one or more communications interfaces and using the electronic contact information for the second electronic device associated with the at least one second associate, a second alert to the second electronic device to inform the at least one second associate of a status of the particular task;

associating a physical indicator of at least one task of the plurality of tasks with the at least one task such that, responsive to a presence of the physical indicator at a site where the at least one task is to be completed and where the at least one first associate is present, the first electronic device associated with the at least one first associate provides the first alert to the first electronic device associated with the at least one first associate, wherein the at least one task of the plurality of tasks is a task that is physically present at the site associated with the physical indicator and is associated with the physical indicator based upon its presence at the site;

determining, based at least in part upon the completion or the non-completion of the particular task by the at least one first associate, a variance for the worksite;

when non-completion of the particular task by the at least one first associate is determined, initiating, via the one or more communications interfaces and using the electronic contact information for the second electronic device associated with the at least one second associate, a third alert to the second electronic device to notify the at least one second associate of the variance for the worksite and request additional information about the non-completion of the task, the third alert including a time interval associated with the request;

determining at least one of a completion or a non-completion of the request, based upon a receipt or anon-receipt of an electronic indication from the at least one second associate responsive or non-responsive to the third alert; and based upon the completion or the non-completion of the request by the at least one second associate, initiating, via the one or more communications interfaces and using the electronic contact information for the third electronic device associated with the at least one third associate, a fourth alert to the third electronic device to inform the at least one third associate of a status of the request.

8. The method as recited in claim 7, wherein the first alert includes the time interval associated with the task.

9. The method as recited in claim 7, wherein the physical indicator is a quick response (QR) code.

10. The method as recited in claim 9, wherein the QR code is displayed on a plaque.

11. The method as recited in claim 7, wherein at least one of the first alert or the second alert comprises a checklist.

12. The method as recited in claim 7, wherein the second alert comprises at least one site score associated with the particular task to be completed by the at least one first associate at the site associated with the physical indicator.

13. The method as recited in claim 12, wherein the site score is provided to the second electronic device in the form of at least one of a text message or an email message.

14. A real-time management system comprising:

one or more processors configured to receive an electronic schedule including a plurality of tasks assigned to be completed at a worksite by at least one first associate at a plurality of time intervals, each one of the plurality of time intervals associated with a corresponding one of the plurality of tasks, each one of the plurality of tasks assigned to the at least one first associate based upon a role assigned to the at least one first associate;

one or more databases including electronic contact information for a first electronic device associated with the at least one first associate, a second electronic device associated with at least one second associate, and a third electronic device associated with at least one third associate, the one or more databases further including a schedule of roles for the at least one first associate, the at least one second associate, and the at least one third associate, where the roles are dynamically assignable to the at least one first associate, the at least one second associate, and the at least one third associate so that the at least one second associate has a managerial role with respect to the at least one first associate, and the at least one third associate has a managerial role with respect to the at least one second associate during the plurality of time intervals;

one or more communications interfaces configured to initiate electronic communications with the first electronic device, the second electronic device, and the third electronic device;

one or more memories having computer executable instructions stored thereon, the computer executable instructions configured for execution by the one or more processors to:

initiate, via the one or more communications interfaces and using the electronic contact information for the first electronic device associated with the at least one first associate, a first alert to the first electronic device to notify the at least one first associate of a particular task of the plurality of the tasks to be completed by the first associate prior to an expiration of a time interval associated with the task, determine at least one of a completion or a non-completion of the particular task, based upon a receipt or a non-receipt of an electronic indication from the at least one first associate responsive or non-responsive to the first alert, based upon the completion or the non-completion of the particular task by the at least one first associate, initiate, via the one or more communications interfaces and using the electronic contact information for the second electronic device associated with the at least one second associate, a second alert to the second electronic device to inform the at least one second associate of a status of the particular task, determine, based at least in part upon the completion or the non-completion of the particular task by the at least one first associate, a variance for the worksite, when non-completion of the particular task by the at least one first associate is determined, initiate, via the one or more communications interfaces and using the electronic contact information for the second electronic device associated with the at least one second associate, a third alert to the second electronic device to notify the at least one second associate of the variance for the worksite and request additional information about the non-completion of the task, the third alert including a time interval associated with the request, determine at least one of a completion or a non-completion of the request, based upon a receipt or anon-receipt of an electronic indication from the at least one second associate responsive or non-responsive to the third alert, and based upon the completion or the non-completion of the request by the at least one second associate, initiate, via the one or more communications interfaces and using the electronic contact information for the third electronic device associated with the at least one third associate, a fourth alert to the third electronic device to inform the at least one third associate of a status of the request; and a physical indicator of at least one task of the plurality of tasks, the physical indicator associated with the at least one task by the one or more processors such that, responsive to a presence of the physical indicator at a site where the at least one task is to be completed and where the at least one first associate is present, the first electronic device associated with the at least one first associate is configured to provide the first alert to the first electronic device associated with the at least one first associate, wherein the at least one task of the plurality of tasks is a task that is physically present at the site of associated with the physical indicator and is associated with the physical indicator based upon its presence at the site.

15. The real-time management system as recited in claim 14, wherein the first alert includes the time interval associated with the task.

16. The real-time management system as recited in claim 14, wherein the physical indicator is a quick response (QR) code.

17. The real-time management system as recited in claim 16, wherein the QR code is displayed on a plaque.

18. The real-time management system as recited in claim 14, wherein at least one of the first alert or the second alert comprises a checklist.

19. The real-time management system as recited in claim 14, wherein the second alert comprises at least one site score associated with the particular task to be completed by the at least one first associate at the site associated with the physical indicator.

20. The real-time management system as recited in claim 19, wherein the site score is provided to the second electronic device in the form of at least one of a text message or an email message.

\* \* \* \* \*